US012447903B2

(12) United States Patent
Schwecke et al.

(10) Patent No.: US 12,447,903 B2
(45) Date of Patent: Oct. 21, 2025

(54) ARTICLE CARRIER MOUNTING LEG

(71) Applicant: Rhino Rack Australia Pty Limited, Eastern Creek (AU)

(72) Inventors: Colin Schwecke, Westleigh (AU); Aakash Patel, Marsden Park (AU); Timothy Follan, Warragamba (AU)

(73) Assignee: Rhino Rack Australia Pty Limited, Eastern Creek (AU)

( * ) Notice: Subject to any disclaimer, the term of this patent is extended or adjusted under 35 U.S.C. 154(b) by 273 days.

(21) Appl. No.: 17/966,170

(22) Filed: Oct. 14, 2022

(65) Prior Publication Data
US 2023/0117288 A1    Apr. 20, 2023

(30) Foreign Application Priority Data
Oct. 14, 2021    (AU) ................................ 2021903304

(51) Int. Cl.
*B60R 9/058*    (2006.01)
*B60R 11/00*    (2006.01)
*F16B 2/10*    (2006.01)

(52) U.S. Cl.
CPC ................ *B60R 9/058* (2013.01); *F16B 2/10* (2013.01); *B60R 2011/004* (2013.01)

(58) Field of Classification Search
CPC .................................... F16B 2/10; B60R 9/058
See application file for complete search history.

(56) References Cited

U.S. PATENT DOCUMENTS

| 5,104,020 A * | 4/1992 | Arvidsson | B60R 9/058 224/322 |
|---|---|---|---|
| D340,021 S | 10/1993 | Yamamoto | |
| D348,034 S | 6/1994 | Mann | |
| D483,241 S | 12/2003 | Miller | |
| D608,718 S | 1/2010 | Nas | |
| D808,889 S | 1/2018 | Puchkoff | |
| D815,012 S | 4/2018 | Badillo | |
| 11,072,293 B2 * | 7/2021 | Andersson | B60R 9/058 |

(Continued)

FOREIGN PATENT DOCUMENTS

CN    308285848    10/2023
DE    102014206719 B4    3/2018

(Continued)

OTHER PUBLICATIONS

Search Report from Australian application No. 2021903304, dated Sep. 9, 2022, 21 pp.

(Continued)

*Primary Examiner* — Derek J Battisti
(74) *Attorney, Agent, or Firm* — Greenberg Traurig, LLP

(57) ABSTRACT

The present disclosure relates to, for example, an article carrier mounting leg, comprising a leg frame having an upper end configured to receive a mounting portion of an article carrier thereupon, and a lower end configured to rest against a leg mounting point, an article carrier mounting element configured to engage with the article carrier mounting portion, an outer clamp jaw movably connected to and outwardly extending from an outer clamp mounting point within the leg frame, and a threaded tightening mechanism. Further embodiments, including methods of attaching an article carrier mounting leg to a leg mounting point, are also provided.

1 Claim, 29 Drawing Sheets

(56) References Cited

U.S. PATENT DOCUMENTS

| | | | |
|---|---|---|---|
| D940,631 S | 1/2022 | Gangappa | |
| D971,813 S | 12/2022 | Menegazzo | |
| D978,060 S | 2/2023 | Yang | |
| D995,403 S | 8/2023 | Park | |
| D1,008,929 S | 12/2023 | Asquith | |
| D1,024,904 S | 4/2024 | Yang | |
| D1,037,128 S | 7/2024 | Schwecke | |
| D1,038,864 S | 8/2024 | Eriksson | |
| 12,097,825 B2 | 9/2024 | Larsson | |
| D1,044,681 S | 10/2024 | Gu | |
| D1,051,019 S | 11/2024 | Jiang | |
| 2003/0089751 A1 | 5/2003 | Munoz | |
| 2004/0211801 A1* | 10/2004 | Barbara | B60R 9/045 224/319 |
| 2008/0169667 A1 | 7/2008 | Siniarski | |
| 2011/0290839 A1 | 12/2011 | Pedrini | |
| 2012/0031942 A1 | 2/2012 | Lundgren | |
| 2016/0185304 A1 | 6/2016 | Pedrini | |
| 2016/0362060 A1* | 12/2016 | D'Angelo | B60R 9/05 |
| 2017/0036585 A1 | 2/2017 | Maeda | |
| 2017/0369000 A1 | 12/2017 | Pedrini | |
| 2019/0217787 A1 | 7/2019 | Kruse | |
| 2020/0141170 A1 | 5/2020 | Shinoda | |
| 2020/0223371 A1 | 7/2020 | Menegazzo | |
| 2020/0377033 A1* | 12/2020 | Andersson | B60R 9/058 |
| 2021/0268968 A1* | 9/2021 | Olaison | B60R 9/058 |
| 2022/0234512 A1 | 7/2022 | Menegazzo | |
| 2023/0117288 A1 | 4/2023 | Schwecke et al. | |
| 2023/0192004 A1 | 6/2023 | Misner | |

FOREIGN PATENT DOCUMENTS

| | | | |
|---|---|---|---|
| GB | 6175044 | | 11/2021 |
| JP | S6268154 | A | 3/1987 |
| JP | 2013126805 | A | 6/2013 |
| JP | D1489996 | | 1/2014 |
| WO | 2008140379 | A1 | 11/2008 |

OTHER PUBLICATIONS

European Search Report dated Mar. 6, 2023 for corresponding European application No. 22201351.8, 14 pages.

LSIT—Stow IT Utility Holder—Large, available in Amazon.com, date first available Nov. 23, 2023 [online], [site visited Dec. 9, 2024], Available from the internet URL: https://www.amazon.com/Rhino-Rack-Stow-Utility-Holder-Large/dp/BOC5D5DHHB.

Rhino Rack Stow It Utility Holder—Regular ZwifLolec, Black, One Size, available on Amazon.com, date first available Jun. 19, 2024 [online], [site visited Dec. 9, 2024], Available from the internet URL: https://www.amazon.com/Rhino-Rack-Stow-Utility-Holder/dp/B0CPS7MV9T.

Rhino Rack Stow It Multi Purpose Utility Holder with Quick Release for Paddles, Fishing Rods, Shovels and More, available on Amazon.com, date first available Jan. 22, 2021 [online], [site visited Dec. 9, 2024], Available from the internet URL: https://www.amazon.com/Rhino-Rack-Purpose-Utility-Release/dp/B08PQ41QRY.

Non-final Office Action from U.S. Appl. No. 29/872,840, dated Dec. 31, 2024, 12 pp.

"Jeep JK Roof Rack Cargo Basket for 007-2018 Jeep Wrangler JK" amazon.com, post Published Jan. 10, 2025. Retrieved Feb. 4, 2025. Available online at URL:https://www.amazon.com/dp/BODSPPJ3NY/ref=sspa_dk_detail_5?psc=1&pd_rd_i=B0DSPPJ3NY&pd_rd_w=YE65j&content-id=amzn 1.sym. f2f1 cf8f-c(Year: 2025).

"Rhino Rack Bike Carrier, Black (RBC036)" amazon.com, post Published Apr. 2, 2012. Retrieved Feb. 4, 2025. Available online at URL: https://www.amazon.com/Rhino-Rack-RBC036-Bike-Carrier/dp/B007QSAS9C (Year: 2012).

"Rhino Rack Stow It Utility Holder" rebeloffroad.com, post Published: Unavailable. Retrieved Feb. 4, 2025. Available online at URL: https://rebeloffroad.com/RSIT/ (Year: 2025).

"Roof Rack Platform 64"×51" Universal Car Top Luggage Rack Aluminum" amazon.com, post Published Dec. 15, 2024. Retrieved Feb. 4, 2025. Available online at URL:https://www.amazon.com/ACU NTCTO-Platform-Universal-Aluminum-Crossbars/dp/B0DQJTBF2P/ref=sr_1_15_sspa?crid=3PI 1 Z?EU Q5IS&dib=eyJ2lj (Year: 2024).

Ex-Parte Quayle Action from U.S. Appl. No. 29/872,525, dated Feb. 12, 2025, 9 pp.

Ex-Parte Quayle Action from U.S. Appl. No. 29/873,779, dated Feb. 12, 2025, 7 pp.

\* cited by examiner

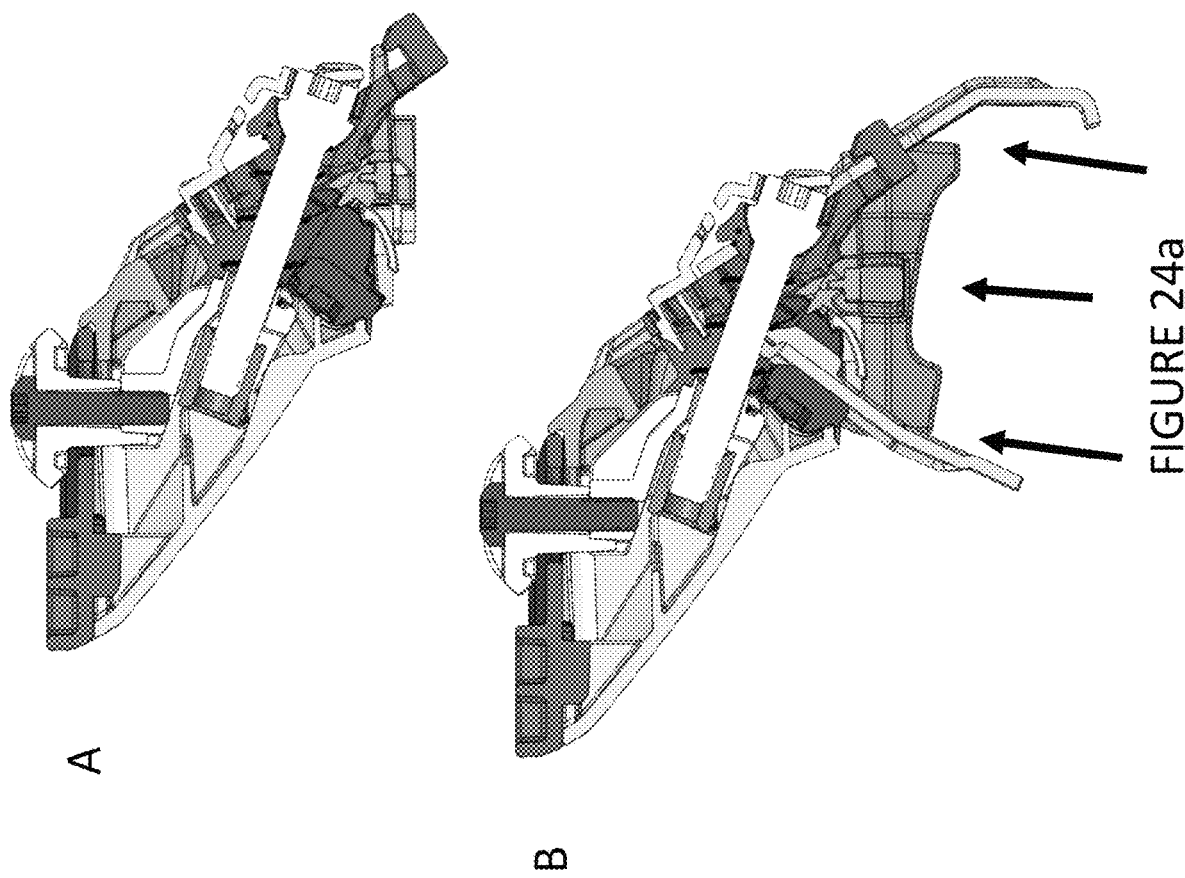

ARTICLE CARRIER MOUNTING LEG

TECHNICAL FIELD

The present disclosure relates generally to the field of mounting article carrier to a vehicle, and more specifically to the field of clamping-type mounting systems.

CROSS-REFERENCE TO RELATED APPLICATION

This application claims priority to Australian Provisional Application No. 2021903304, entitled Article Carrier Mounting Leg, filed 14 Oct. 2021. This application is herein incorporated by reference in its entirety.

BACKGROUND

Vehicle roofs provide a suitable surface for storing, mounting and transporting additional cargo, equipment and other loads. Many utility vehicles may have inbuilt mounting points (for example a vehicle roof rail), and the vehicle may be structurally and mechanically capable of carrying additional load. For example, a vehicle that is capable of using a mounting article carrier leg to support a removable vehicle canopy or cross-bar system used for storing, mounting and transportation of additional cargo.

As the skilled person will appreciate, prior art mounting article carrier legs require multiply steps first to affix article carrier leg to the leg mounting point (e.g., roof rack) on the vehicle and then further steps to affix article carrier legs to the article cross-bar system.

There is therefore a need for an article carrier leg for a cross-bar system that when tightening the tightening mechanism (for example, a bolt) into the article carrier leg, the action of the tight mechanism secures the article carrier leg to the article carrier (i.e., vehicle's roof rail), while engaging a mechanism that fastens the leg to the article carrier (i.e., the cross-bar system). There is an advantage to an article carrier leg that in one tightening motion secures the leg to the car side rail and to the cross-bar.

There is a need for an article carrier leg that may be mounted with one tightening motion in that such a device overcomes the problems associated with the prior art devices, or at least provides an alternative thereto. There is also a need for an article carrier leg that is rated for higher maximum load tolerances.

The present disclosure is directed to overcome and/or ameliorate at least one or more of the disadvantages of the prior art, as will become apparent from the discussion herein. The present disclosure also provides other advantages and/or improvements as discussed herein.

SUMMARY

In at least one embodiment, the present disclosure relates to an article carrier mounting leg, comprising: a leg frame having an upper end configured to receive a mounting portion of an article carrier thereupon, and a lower end configured to rest against a leg mounting point, an article carrier mounting element configured to engage with the article carrier mounting portion, an outer clamp jaw movably connected to and outwardly extending from an outer clamp mounting point within the leg frame, and a threaded tightening mechanism. In certain exemplary embodiments, the tighten mechanism does not have to be threaded and other suitable tighten mechanisms may be used.

In at least one embodiment, the outer clamp jaw is able to move between a first position and a second position, the first position comprising the outer clamp jaw being distal to an outer surface of the leg mounting point, and the second position comprising the outer clamp jaw being in contact with the outer surface of the leg mounting point.

In at least one embodiment, when the outer clamp jaw is in the second position, the threaded tightening mechanism is able to be inserted to form an operable connection between the outer clamp jaw and a threaded receiver, and actuation of the threaded tightening mechanism in a first direction induces tightening between the outer clamp jaw and threaded receiver, thereby inducing a clamping engagement between the outer clamp jaw and the mounting point outer side.

In at least one embodiment, the outer clamp jaw comprises a clamp body portion that receives the threaded tightening mechanism therethrough, a pivoting portion at a first end of the clamp body portion and shaped to pivot about the outer clamp mounting point, and a bracket portion for engaging with the mounting point outer side, the bracket portion extending from a second end of the clamp body portion.

In at least one embodiment, the bracket portion comprises a detachable bracket that attaches to an outer face of the clamp body portion. In a further embodiment, the detachable bracket comprises at least one aperture, and the clamp body portion comprises at least one hook-forming protrusion that engages with the at least one aperture of the detachable bracket.

In at least one embodiment, the pivoting portion is a slidable pivoting portion, such that the outer clamp jaw is able to both slide relative to, and pivot about, the outer clamp mounting point. In at least one embodiment, the outer clamp mounting point comprises a fulcrum portion, and the pivoting portion of the outer clamp jaw comprises a curved flange having a concave surface that bears against the fulcrum portion. In a further embodiment, a radius of curvature of the concave surface of the pivoting portion is greater or substantially greater than a radius of curvature of the fulcrum portion of the outer clamp mounting point. In a further embodiment, the outer clamp jaw further comprises a retaining element arranged to retain the concave surface of the curved flange against the fulcrum portion of the outer clamp mounting point. In a further embodiment, the retaining element is attachable to, and detachable from, the clamp body portion. In a further embodiment, the bracket portion comprises a detachable bracket having at least one aperture that engages with at least one hook-forming protrusion on the clamp body portion, and the retaining element is further shaped to, upon attaching to the clamp body portion, maintain the at least one aperture of the detachable bracket and at least one hook-forming protrusion of the clamp body portion in engagement with one another.

In at least one embodiment, the article carrier mounting leg may further comprise an inner clamp jaw extending from proximal to the lower end of the leg frame on an inner side of the leg mounting point. In at least one embodiment, the inner clamp jaw may be pivotably mounted to the leg frame. In an alternate embodiment, the inner clamp jaw may be a fixed inner clamp jaw.

In at least one embodiment, the inner clamp jaw comprises an inner clamp body that pivotably mounts to the inner frame, and a detachable inner clamp bracket that engages with the inner side of the leg mounting point. In a further embodiment, the inner clamp body comprises a slot that receives the detachable inner clamp bracket; and a hook-shaped retaining structure protruding into the slot that engages with an aperture in the detachable inner clamp bracket.

In at least one embodiment, the threaded receiver comprises a sliding body and a threaded aperture that receives the second end portion of the threaded tightening mechanism, and actuation of the threaded tightening mechanism in the first direction urges the threaded receiver and the outer clamp jaw towards one another. In a further embodiment, the threaded tightening mechanism is able to pivot, slide, or otherwise move with respect to either or both of the outer clamp jaw and the threaded receiver so as to remain oriented relative thereto, the pivoting, sliding or other movement being about an axis perpendicular or approximately perpendicular thereto. In a further embodiment, the threaded aperture of the threaded receiver is provided by a pivotable threaded nut. In a further embodiment, the outer clamp jaw comprises an aperture that the longitudinal body of the threaded tightening mechanism extends through, and the aperture is shaped to enable the threaded tightening mechanism to pivot, slide, or otherwise move about the axis perpendicular or approximately perpendicular thereto.

In at least one embodiment, the article carrier mounting element comprises a lower end portion that is mechanically connected to the sliding body of the threaded receive, and an engaging portion that extends through the upper end of the leg frame and engages with the article carrier mounting portion, such that urging the sliding body and the outer clamp jaw towards one another pulls the article carrier mounting portion against the upper end of the leg frame.

A further aspect of this disclosure may lie in an article carrier mounting leg, comprising a leg frame having an upper end configured to receive a mounting portion of an article carrier thereupon, and a lower end configured to rest against a leg mounting point, an article carrier mounting element configured to engage with the article carrier mounting portion, a threaded receiver comprising a sliding body and a threaded aperture, and a threaded tightening mechanism in engagement with the threaded aperture of the threaded receiver. In at least one embodiment, the threaded tightening mechanism is arranged such that rotating the threaded tightening mechanism urges the threaded receiver to move therealong in a first direction, while contra-rotation urges the threaded receiver to move therealon in an opposing second direction, the article carrier mounting element comprises an engaging portion that engages with the mounting portion of the article carrier, and the engaging portion is mechanically connected to the sliding body of the threaded receiver, such that movement of the threaded receiver in the first direction pulls the article carrier mounting portion against the upper end of the leg frame.

A further aspect of the present disclosure relates to a method of attaching an article carrier mounting leg to a leg mounting point. In at least one embodiment, the method comprises the steps of:
i. positioning the article carrier mounting leg such that a lower end of a leg frame thereof rests against the leg mounting point;
ii. arranging a mounting portion of an article carrier to be in engagement with an article carrier mounting element of the article carrier mounting leg, proximal to an upper end of the article carrier mounting leg configured to receive the mounting portion;
iii. pivoting an outer clamp jaw that is movably connected to an outer clamp mounting point within the leg frame from a first position to a second position; and
iv. inserting a threaded tightening mechanism through the outer clamp jaw and into engagement with a threaded receiver.

In at least one embodiment, the method comprises the steps of:
i. positioning the article carrier mounting leg such that a lower end of a leg frame thereof rests against the leg mounting point;
ii. arranging a mounting portion of an article carrier to be in engagement with an article carrier mounting element of the article carrier mounting leg, proximal to an upper end of the article carrier mounting leg configured to receive the mounting portion; and
iii. actuating a threaded tightening mechanism of the article carrier mounting leg, which extends through an outer clamp jaw movably connected to an outer clamp mounting point within the leg frame and into engagement with a threaded receiver, in a first direction, such that the outer clamp jaw is urged to slide from a first position to a second position.

In at least one embodiment, the first position comprises the outer clamp jaw being in loose contact with an outer surface of the leg mounting point, and the second position comprises the outer clamp jaw being in clamping contact with the outer surface of the leg mounting point.

In at least one embodiment, the article carrier mounting leg further comprises an inner clamp jaw pivotably mounted to the leg frame and extending along an inner side of the leg mounting point, and as the outer clamp jaw moves from the first position to the second position, it contacts an upper end of the inner clamp jaw, which is thereby urged to pivot into engagement with the inner side of the leg mounting point.

In at least one embodiment, the threaded receiver comprises a sliding body and a threaded aperture that receives an end portion of the threaded tightening mechanism, and actuation of the threaded tightening mechanism in the first direction urges the threaded receiver and the outer clamp jaw towards one another.

In at least one embodiment, the article carrier mounting element comprises a lower end portion that is mechanically connected to the sliding body of the threaded receiver, and an engaging portion that extends through the upper end of the leg frame and engages with the article carrier mounting portion, such that urging the threaded receiver and the outer clamp jaw towards one another pulls the article carrier mounting portion against the upper end of the leg frame.

In at least one embodiment, the method comprises the steps of:
i. positioning the article carrier mounting leg such that a lower end of a leg frame thereof rests against the leg mounting point;
ii. arranging a mounting portion of an article carrier to be in engagement with an article carrier mounting element of the article carrier mounting leg, proximal to an upper end of the article carrier mounting leg configured to receive the mounting portion;
iii. pivoting an outer clamp jaw that is movably connected to an outer clamp mounting point within the leg frame from a first position to a second position;
iv. inserting a threaded tightening mechanism through an aperture in the outer clamp jaw and into engagement with a threaded receiver; and
v. actuating the threaded tightening mechanism in a first direction, such that the outer clamp jaw is urged to slide from the second position to a third position.

In at least one embodiment, the first position comprises the outer clamp jaw being distal to an outer surface of the leg mounting point, the second position comprises the outer clamp jaw being in loose contact with an outer surface of the leg mounting point, and the third position comprises the outer clamp jaw being in clamping contact with the outer surface of the leg mounting point.

In a further embodiment, the article carrier mounting leg further comprises an inner clamp jaw pivotably mounted to the leg frame and extending from proximal to the lower end thereof, on an inner side of the leg mounting point, as the outer clamp jaw pivots from the first position to the second position, it contacts an upper end of the inner clamp jaw, and as the outer clamp jaw slides from the second position to the third position, the inner clamp jaw is urged to pivot into engagement with the inner side of the leg mounting point.

In at least one embodiment, the threaded receiver comprises a sliding body and a threaded aperture that receives an end portion of the threaded tightening mechanism, and the actuation of the threaded tightening mechanism in the first direction urges the threaded receiver and the outer clamp jaw towards one another.

In at least one embodiment, the article carrier mounting element comprises a lower end portion that is mechanically connected to the sliding body of the threaded receiver, and an engaging portion that extends through the upper end of the leg frame and engages with the article carrier mounting portion, such that urging the threaded receiver and the outer clamp jaw towards one another pulls the article carrier mounting portion against the upper end of the leg frame.

Further embodiments may be described below or may otherwise be clear in light of the following disclosure. These and other embodiments are considered to fall within the scope of the present disclosure.

DESCRIPTION OF FIGURES

Embodiments of the present disclosure will now be described in relation to figures, wherein:

FIGS. 24a to 24j depict modes of operation of certain embodiments.

DETAILED DESCRIPTION

The following description is provided in relation to several embodiments that may share common characteristics and features. It is to be understood that one or more features of one embodiment may be combined with one or more features of other embodiments. In addition, a single feature or combination of features in certain of the embodiments may constitute additional embodiments. Specific structural and functional details disclosed herein are not to be interpreted as limiting, but merely as a representative basis for teaching one skilled in the art to variously employ the disclosed embodiments and variations of those embodiments.

The subject headings used in the detailed description are included only for the ease of reference of the reader and should not be used to limit the subject matter found throughout the disclosure or the claims. The subject headings should not be used in construing the scope of the claims or the claim limitations.

In addition to other advantages disclosed herein, one or more of the following advantages may be present in certain exemplary embodiments. One advantage in at least one embodiment of the disclosed article carrier leg for a cross-bar system is that when tightening the tightening mechanism (for example, a bolt) into the article carrier leg, the action of the tight mechanism secures the article carrier leg to the article carrier (i.e., vehicle's roof rail), while engaging a mechanism that fastens the leg to the article carrier (i.e., the cross-bar system). An article carrier leg that in one tightening motion secures the leg to the vehicle's roof rail and to the cross-bar is an advantage because of the ease of use and/or ease of installation.

Another advantage in at least one embodiment of the disclosed article carrier leg for a cross-bar system is that it is designed to work with solid or flush style factory roof rails (no gap underneath) but will also fit on raised or bridge style roof rails (have a gap underneath).

Figure 1:
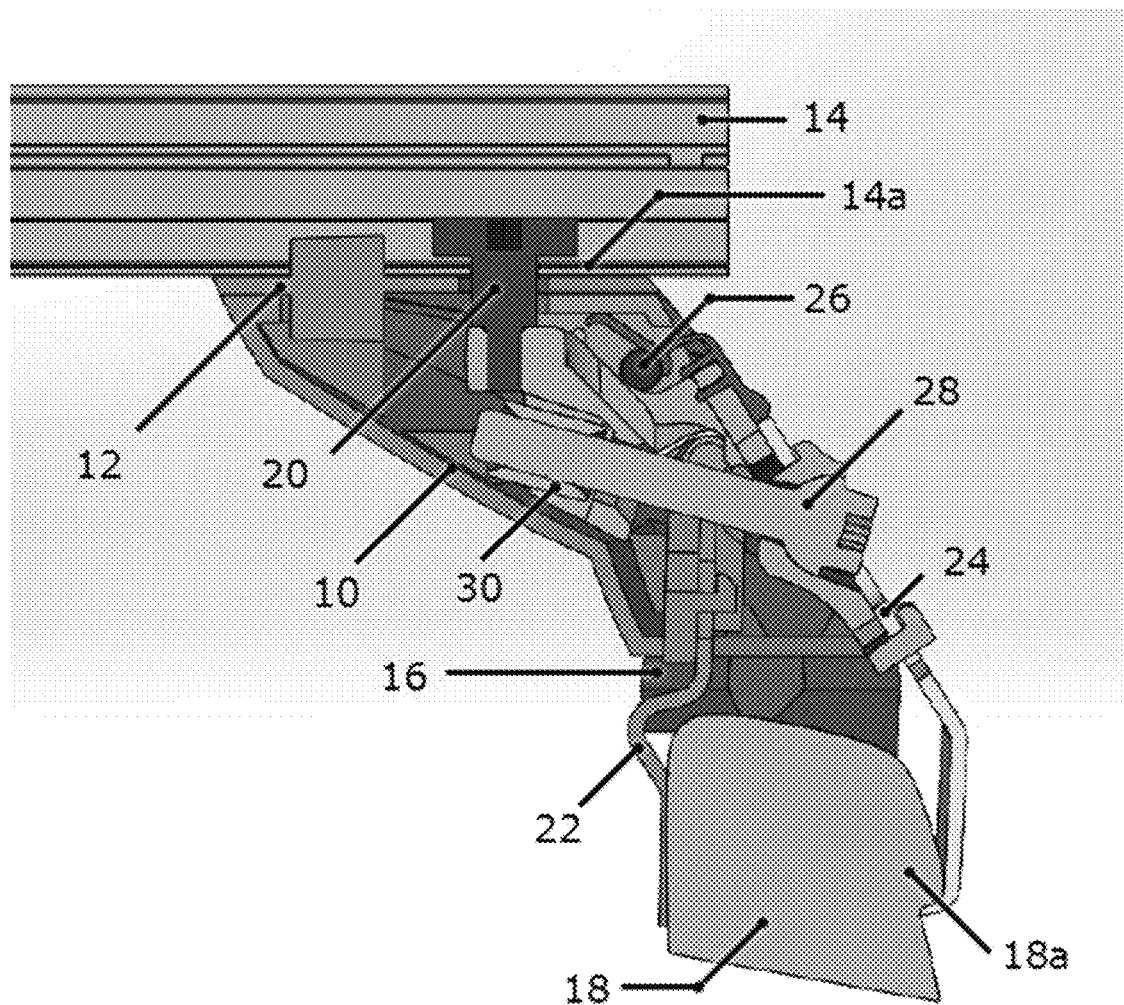
FIG. 1 depicts an embodiment of an article carrier mounting leg.

In at least one embodiment and with reference to FIG. 1, the present disclosure relates to an article carrier mounting leg, comprising a leg frame 10 having an upper end 12 configured to receive a mounting portion 14a of an article carrier 14 thereupon, and a lower end 16 configured to rest against a leg mounting point 18, an article carrier mounting element 20 configured to engage with the article carrier mounting portion 14a, an outer clamp jaw 24 movably connected to and outwardly extending from an outer clamp mounting point within the leg frame 10, and a threaded tightening mechanism 28. In at least one embodiment, the outer clamp jaw 24 is able to move between a first position and a second position, the first position comprising the outer clamp jaw 24 being distal to an outer surface of the leg mounting point 18, and the second position comprising the outer clamp jaw 24 being in contact with the outer surface of the leg mounting point 18.

In at least one embodiment, the threaded tightening mechanism 28 is separable from the rest of the article carrier mounting leg. When the outer clamp jaw 24 is contacting against the mounting point outer side 18a, the threaded tightening mechanism 28 is able to be inserted to form an operable connection between the outer clamp jaw 24 and a threaded receiver 30. Once inserted and engaged with the threaded receiver 30, actuation of the threaded tightening mechanism 28 in a first direction induces tightening between the outer clamp jaw 24 and threaded receiver 30, thereby inducing a clamping engagement between the outer clamp jaw 24 and the mounting point outer side 18a.

The Outer Clamp Jaw 24

In at least one embodiment, the outer clamp jaw 24 is able to both pivot and slide about the outer clamp mounting point 26. In such an embodiment, actuation of the threaded tightening mechanism 28 to induce a clamping engagement comprises the outer clamp jaw 24 sliding diagonally upwards, such that a lower bracket portion 36 may engage or engages with the mounting point outer side 18*a*. This may be of use where the mounting point outer side 18*a* is not a uniform surface. This may be, for example, a solid vehicle rail, which typically have a cross-section with a distinct bulge or other deformation on an outer surface thereof to provide a surface for clamping legs to bear against. It may also be present in embodiments wherein the outer clamp jaw 24 engages with a portion of the vehicle frame itself, such as a portion of the vehicle doorframe.

Figure 2:
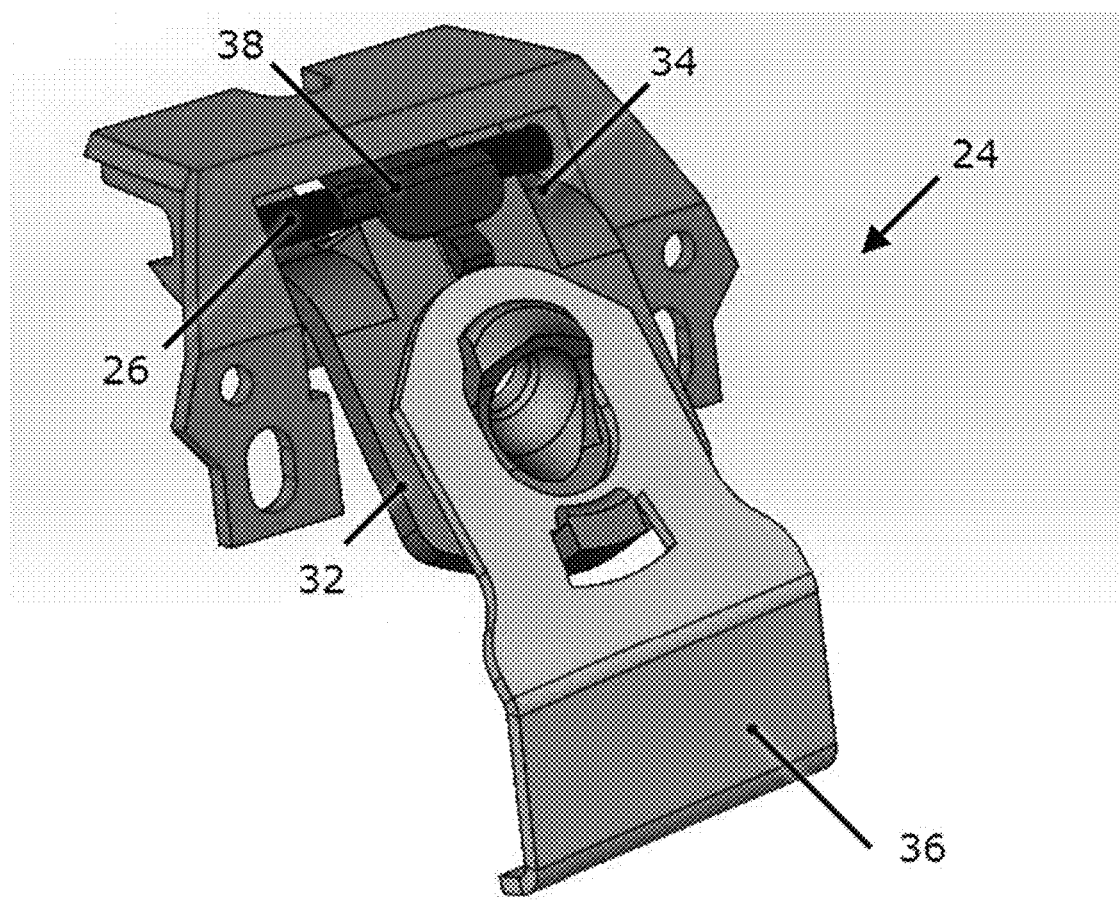
FIGS. 2-4 depict embodiments of an outer and inner clamp jaw.

In at least one embodiment and with reference to FIG. 2 the outer clamp jaw 24 comprises a clamp body portion 32 having an aperture that the threaded tightening mechanism 28 is inserted therethrough. The outer clamp jaw 24 may additionally comprise a pivoting portion at a first end of the clamp body portion 32, which is shaped to pivot about the outer clamp mounting point, and a bracket portion 36, for engaging with the mounting point outer side 18*a*, which extends from a second end of the clamp body portion 32.

In at least one embodiment, the pivoting portion 34 may be a slidable pivoting portion, such that the outer clamp jaw 24 is able to both slide relative to, and pivot about, the outer clamp mounting point 26. In such an embodiment, following engagement of the threaded tightening mechanism 28 through the outer clamp jaw 24 and with the threaded receiver 30, tightening of the threaded tightening mechanism 28 (i.e., actuation in the first direction) may cause the outer clamp jaw 24 to slide inwards so as to clamp against the mounting point outer side 18*a*. In certain embodiments wherein the outer clamp jaw 24 is able to slide inwards, the direction in which the outer clamp jaw 24 slides may not be horizontal. The direction of sliding movement may be upwards inclined or diagonal. This is of benefit in embodiments wherein the profile of the leg mounting point 18 comprises a lip on the outer side, as the diagonal sliding motion may promote optimal clamping engagement between the bracket portion 36 and the lip of the mounting point outer side 18*a*.

In at least one embodiment, the outer clamp mounting point 26 may comprise a fulcrum portion, and the pivoting portion 34 may comprise a curved flange having a concave surface that bears against the fulcrum portion. In a further embodiment, the radius of curvature of the concave surface of the pivoting portion 34 is greater or substantially greater than a radius of curvature of the fulcrum portion of the outer clamp mounting point 26, thereby enabling the outer clamp jaw 24 to slide as well as pivot about the outer clamp mounting point 26.

Figure 3:
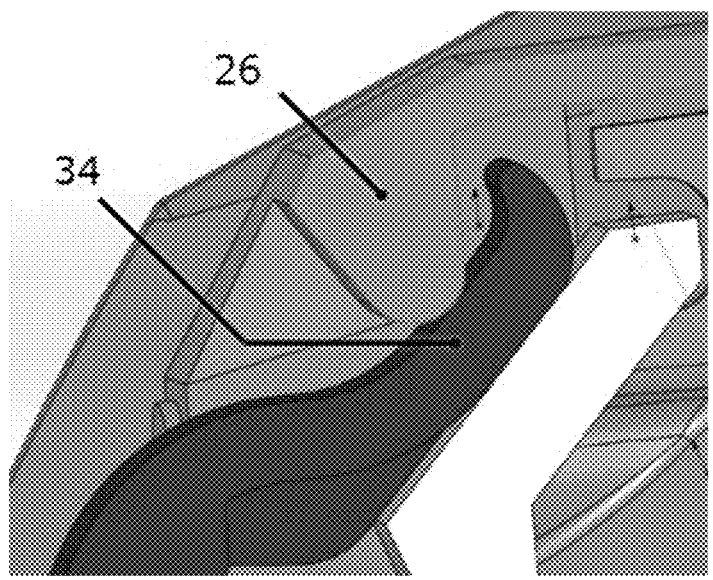

In at least one embodiment, the fulcrum portion may comprise a rod, pin or otherwise cylindrical element extending, perpendicular or substantially perpendicular to a direction of movement of the outer clamp jaw. In an alternate embodiment, and as depicted in FIG. 3, the fulcrum portion 26 may comprise a protrusion extending from the leg frame to provide a curved bearing surface for the concave surface of the pivoting portion of the outer clamp jaw to bear against.

In a further embodiment wherein the pivoting portion 34 comprises the curved flange, the outer clamp jaw 24 may further comprise a retaining element 38 arranged to retain the concave surface of the curved flange against the fulcrum portion of the outer clamp mounting point 26. This may be of benefit in an embodiment wherein the fulcrum portion comprises a rod, pin or other cylindrical element, as the effect of the combination of the retaining element 38 and the curved flange is to form a slot that substantially encircles the fulcrum portion of the outer clamp mounting point 26, wherein the slot is stretched or extended in a certain direction so as to have a geometric stadium-shaped periphery. This may enable the outer clamp jaw 24 to slide inwards in a clamping action once it has pivoted or rotated to be in contact with the mounting point outer side 18*a*.

In a further embodiment, the retaining element 38 may be attachable to, and detachable from, the clamp body portion 32. This may enable the outer clamp jaw 24 to be fully removed from the article carrier mounting leg for, e.g., maintenance or cleaning. This may also enable the outer clamp jaw 24 having a bracket portion 36 that conforms to a particular leg mounting point profile be swapped out for an outer clamp jaw 24 conforming to a different leg mounting point profile.

In at least one embodiment, the outer clamp jaw 24 receives the threaded tightening mechanism 28 therethrough. The aperture that the threaded tightening mechanism 28 extends through is not necessarily a threaded aperture 48. In some embodiments, movement and/or tightening of the outer clamp jaw 24 may be induced by the head of the threaded tightening mechanism 28 bearing against the clamp body portion 32. In further embodiments, the clamp body portion 32 may comprise a recess for the head of the threaded tightening mechanism 28 to sit within.

In further embodiments, it may be beneficial for the threaded tightening mechanism 28 to have leeway to move, pivot or otherwise be re-angled. For example, thickness of the leg mounting point 18 may dictate the angle at which the outer clamp jaw 24 is considered 'in contact' with the mounting point outer side 18*a*, and so the insertion of the threaded tightening mechanism 28 may be at slightly different angles. In such an embodiment and with reference to FIG. 1, the aperture of the outer clamp jaw 24 may be shaped to enable the threaded tightening mechanism 28 to pivot, slide or otherwise move about the axis perpendicular or approximately perpendicular thereto. This may be through widening of the aperture, through providing a frustoconical cut, or through other suitable conventional mechanism known in the art.

The Inner Clamp Jaw

In at least one embodiment, the article carrier mounting leg may further comprise an inner clamp jaw 22 extending from proximal to the lower end 16 thereof and on an inner side of the leg mounting point 18. In some embodiments, the inner clamp jaw 22 may not move, and may simply act as a stationary clamping jaw with respect to the movable outer clamp jaw 24. In alternate embodiments (and as depicted in the figures) the inner clamp jaw may be mobile.

In at least one embodiment, the inner clamp jaw 22 may be pivotably mounted to the leg frame 10 and extending from proximal to the lower end 16 thereof and on an inner side of the leg mounting point 18.

In at least one embodiment, the inner clamp jaw 22 is urged to pivot into clamping engagement with an inner side of the leg mounting point 18 by the outer clamp jaw 24 bearing against an upper end 12 thereof.

Figure 4:
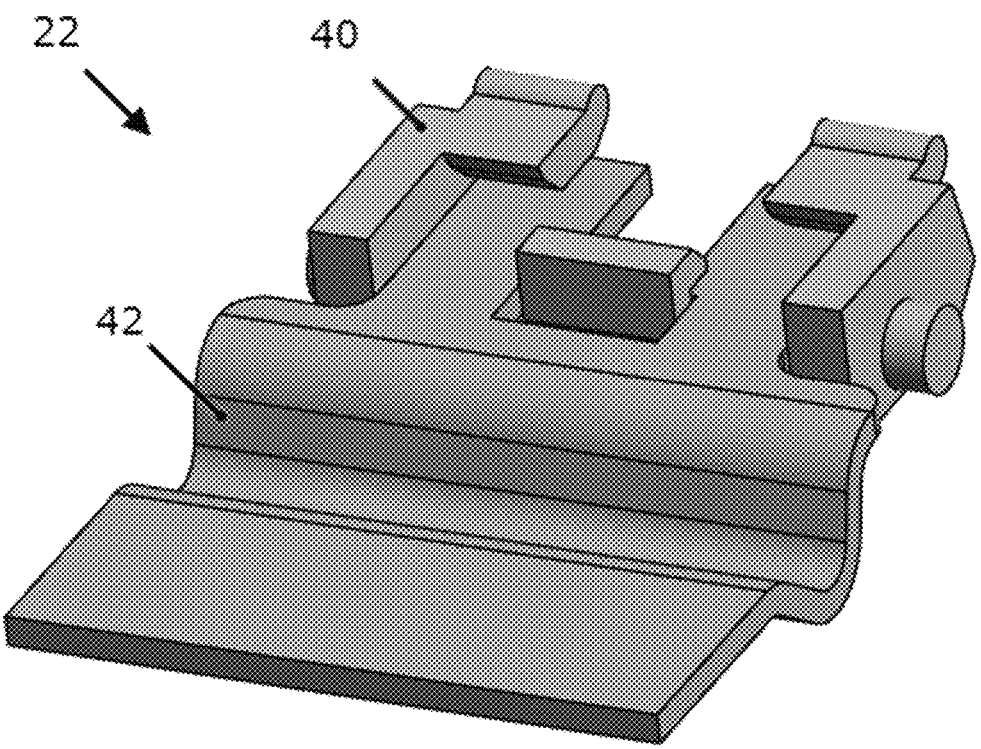

In at least one embodiment and with reference to FIG. 4, the inner clamp jaw 22 may comprise an inner clamp body 40 portion 40 and an inner clamp bracket portion 42 that extends downwards to sit alongside an inner surface of the leg mounting point 18.

Figure 5:
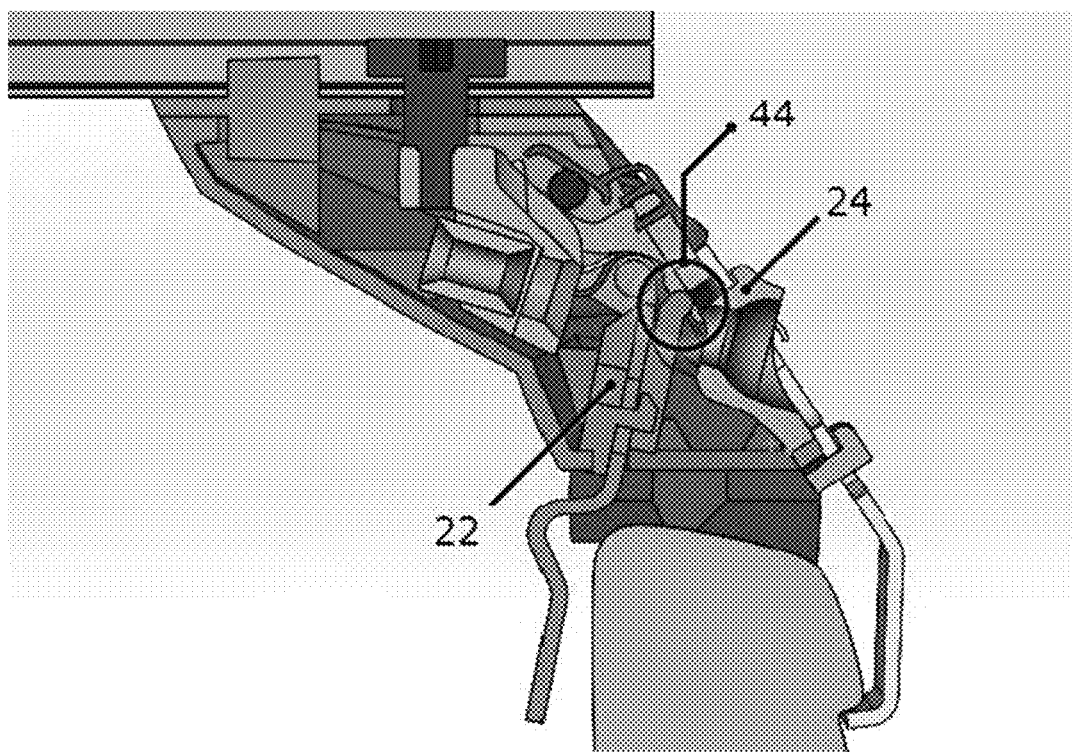
FIG. 5 depicts an embodiment of how the inner clamp jaw is actuated.

In at least one alternate embodiment and with reference to FIG. 5, the inner clamp jaw 22 may be pivotably mounted to the leg frame 10. In a further embodiment, movement of the inner clamp jaw 22 may be driven by the outer clamp jaw 24. In one such exemplary embodiment, the inner clamp jaw 22 may comprise an upper portion that is on an opposing side of the pivot point of the inner clamp jaw 22 from the inner clamp bracket portion 42. As depicted in FIG. 5, as the outer clamp jaw 24 moves inwards, a portion thereof may contact 44 against the upper portion of the inner clamp jaw 22, pushing it. This may in turn urge the inner clamp bracket portion 42 against the rail so as to provide a clamping force thereagainst.

The Threaded Receiver

In at least one embodiment, the threaded receiver 30 may act as a brace for actuation of the threaded tightening mechanism 28, so as to ensure at least in part that the inner clamp jaw 22 and outer clamp jaw 24 tighten about the leg mounting point 18 and clamp the article carrier mounting leg thereto. In some embodiments, the threaded receiver 30 may be capable of limited movement. This is not mutually exclusive to embodiments wherein the threaded receiver 30 acts as a brace. In at least one embodiment and with reference to FIG. 6, the leg frame 10 may comprise an inclined surface 10a. The threaded receiver 30 may comprise a sliding body 46 that is arranged to slide within the leg frame 10, with the inclined surface being a lowermost limit upon the sliding movement thereof. The sliding body 46 may further comprise a threaded aperture 48 that receives the second end portion of the threaded tightening mechanism 28. In such an embodiment, actuation of the threaded tightening mechanism 28 in the first direction may urge the threaded receiver 30 and the outer clamp jaw 24 towards one another.

In some embodiments wherein the outer clamp jaw 24 comprises a pivoting portion 34 having a curved flange, the outer convex surface thereof may bear against an upper surface of the sliding body 46. The sliding body 46 may act as a wedge between the inclined surface 10a and the curved flange of the outer clamp jaw 24, so as to promote an upwards diagonal or inclined sliding movement of the outer clamp jaw 24 as it is drawn inwards. As previously noted, inclined movement is considered to be of benefit in embodiments wherein the profile of the leg mounting point 18 comprises a lip on the outer side, as the diagonal sliding motion may promote optimal clamping engagement between the bracket portion 36 and the lip of the mounting point outer side 18a.

It may be of benefit in certain scenarios to provide a mechanism for the threaded aperture 48 of the threaded receiver 30 to be able to be adjusted to receive the threaded tightening mechanism 28 from different angles. As previously noted, thickness of the leg mounting point 18 may dictate the angle at which the outer clamp jaw 24 is considered in contact with the mounting point outer side 18a, and so the insertion of the threaded tightening mechanism 28 may be at slightly different angles. Additionally, in certain embodiments, the threaded receiver 30 and/or the outer clamp jaw 24 is capable of sliding movement. In such embodiments the threaded aperture 48 may need to reorient itself.

In at least one embodiment, the threaded tightening mechanism 28 may be able to pivot, slide or otherwise move with respect to either or both of the outer clamp jaw 24 and the threaded receiver 30 so as to remain appropriately oriented relative thereto. In such an embodiment, the pivoting, sliding or other movement may be limited to an axis perpendicular or approximately perpendicular to the longitudinal axis of the threaded tightening mechanism 28.

Figure 7:
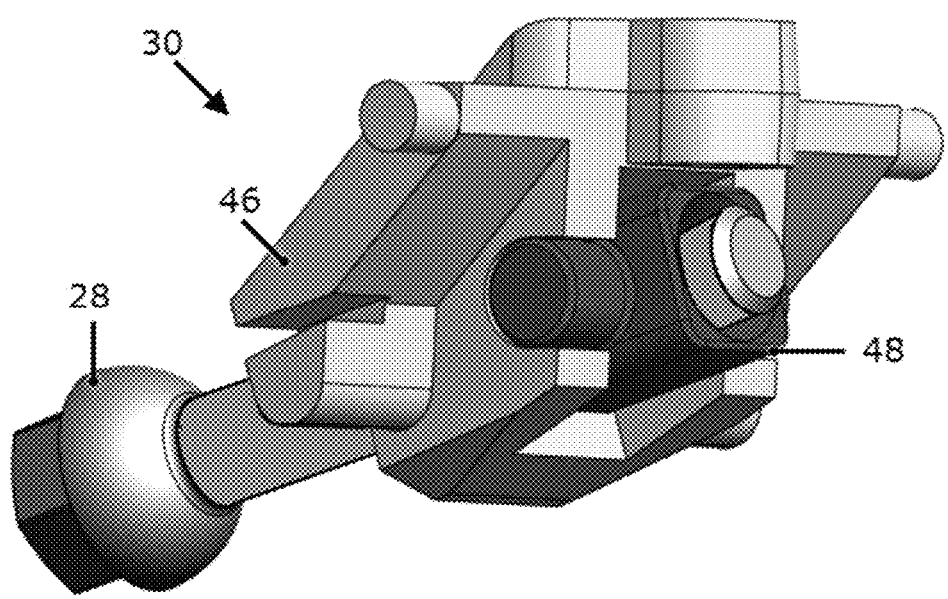

In at least one further embodiment and with reference to FIG. 7, the threaded aperture 48 of the threaded receiver 30 may be provided by a pivotable threaded nut. The pivotable threaded nut may attach, rest or otherwise bear against a pivot point on the sliding body 46. The threaded nut may be positioned on a side of the sliding body 46 distal to the outer clamp jaw 24, or otherwise is positioned so that actuation of a received threaded tightening mechanism 28 in the first direction (i.e., tightening) may pull the pivotable threaded nut against the sliding body 46.

The Article Carrier Mounting Element

In at least one embodiment, the article carrier mounting element 20 comprises an engaging portion that extends upwardly from the upper end 12 of the leg frame 10 and engages with the article carrier mounting portion 14a. With reference to FIG. 1, the form of the engaging portion depicted therein is a channel nut engaging with a flanged channel on the underside of the article carrier 14. However, those of ordinary skill in the art will appreciate that the engaging portion may comprise suitable method known in the art without departing from the scope of this disclosure.

With return reference to FIG. 6, in an embodiment wherein the threaded receiver 30 comprises a sliding body 46, the article carrier mounting element 20 may comprise a lower end portion 50 that is mechanically connected to the sliding body 46 of the threaded receiver 30. In such an embodiment, when the threaded tightening mechanism 28 is actuated in a first direction and the sliding body 46 and the outer clamp jaw 24 are urged towards one another, the movement of the sliding body 46 may the pull the article carrier mounting element 20 downwards. This may subsequently pull the article carrier mounting portion 14a against the upper end 12 of the leg frame 10.

Figure 6:
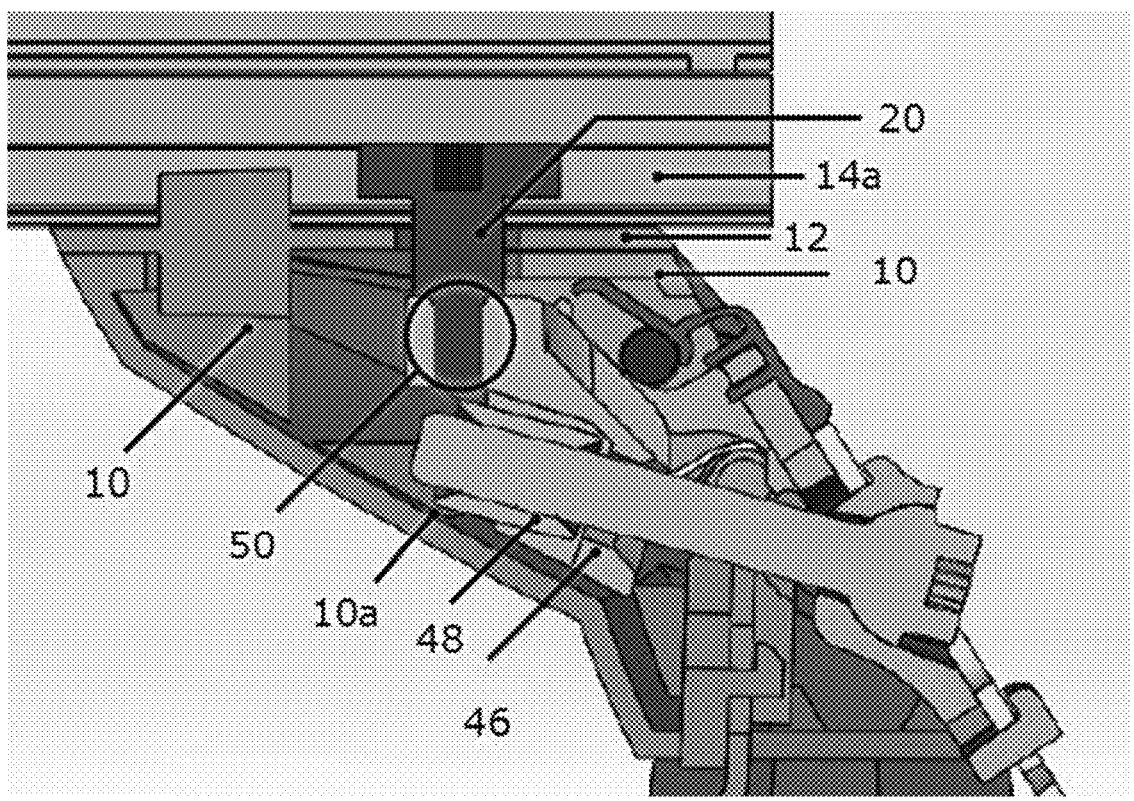
FIGS. 6 & 7 depicts an embodiment of a threaded receiver.

A moving/withdrawing article carrier mounting element 20 may be of carrier 14 thereto, with the downwards movement of the article carrier mounting element 20 serving to close off access to the article carrier mounting portion 14a mounting element 20. Additionally, in embodiments wherein the engaging portion of the article carrier mounting element 20 is a clamping-type engaging portion, clamping engagement of the article carrier 14 to the upper end 12 of the article carrier mounting leg may be enabled by the downwards movement of the article carrier mounting element 20. One such example is depicted in FIG. 6, wherein the article carrier 14 is held in engagement by clamping between a flat, horizontally-extending upper end of the article carrier mounting element 20 and the upper end 12 of the leg frame 10.

Leg Mounting Point Profile Adaptation

The bracket portions of the inner clamp jaw 22 and outer clamp jaw 24, as well as the lower end 16 of the leg frame 10, are the only portions of the article carrier mounting leg that directly contact a side of the leg mounting point. As those of ordinary skill in the art will appreciate, different leg mounting point 18s may have differing profiles. However, it may be difficult to design components that that are able to snugly and securely clamp against a multitude of leg mounting points each having differing profiles.

Therefore, in at least one embodiment, at least one of the bracket portions of the inner clamp jaw 22 and outer clamp jaw 24 and the lower end 16 of the leg frame 10 may be interchangeable with alternate forms of the same that snugly contour to a leg mounting point 18 with a different profile. This is considered advantageous to manufacturers as it may enable the remaining components of the article carrier mounting leg to be common components, with the only detachable portions of the article carrier mounting leg needing to be specific to each leg mounting point 18.

Figure 8:
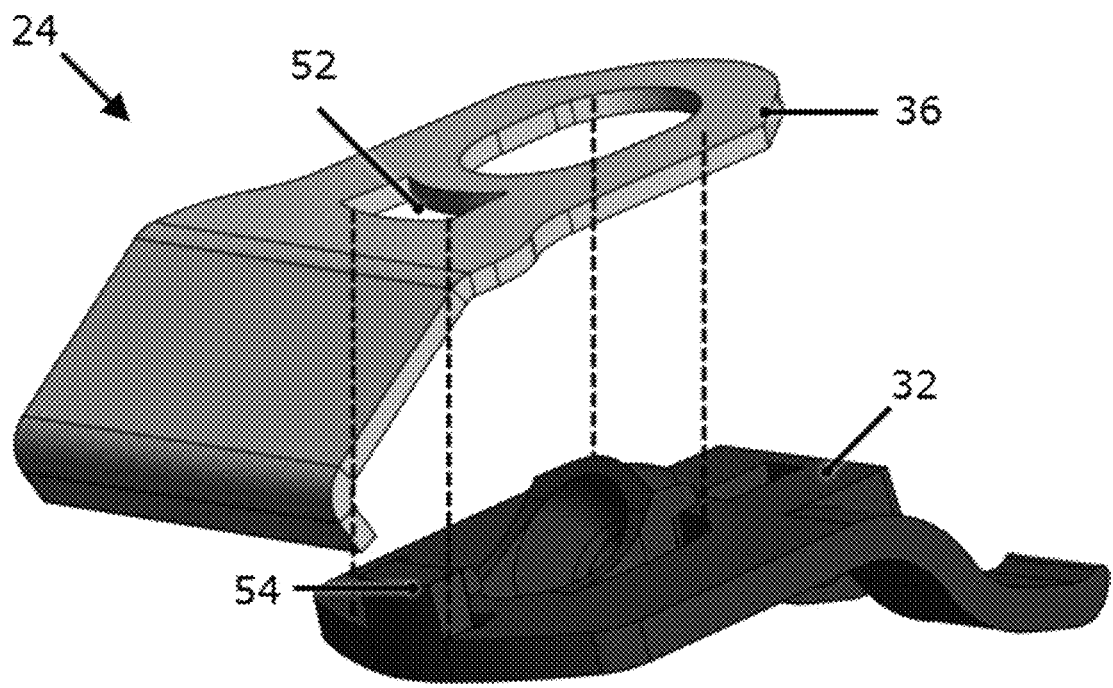
FIGS. 8 & 9 depict further embodiments of the outer and inner clamp jaw.

In at least one embodiment, the bracket portion 36 of the outer clamp jaw 24 may comprise a detachable bracket that attaches to an outer face of the clamp body portion 32. The detachable bracket may further comprise at least one aperture 52 that receives a locking protrusion 54 therethrough. In such an embodiment and as depicted in FIG. 8, the clamp body portion 32 may comprise at least one hooked locking protrusion 54 that engages with the aperture 52 of the detachable bracket. In a further embodiment wherein the outer clamp jaw 24 further comprises a curved flange and detachable retaining element 38, attachment of the retaining element 38 to the clamp body portion 32 may also serve to maintain the aperture 52 of the detachable bracket and the hook-shaped locking protrusion 54 of the clamp body portion 32 in engagement with one another.

Figure 9:
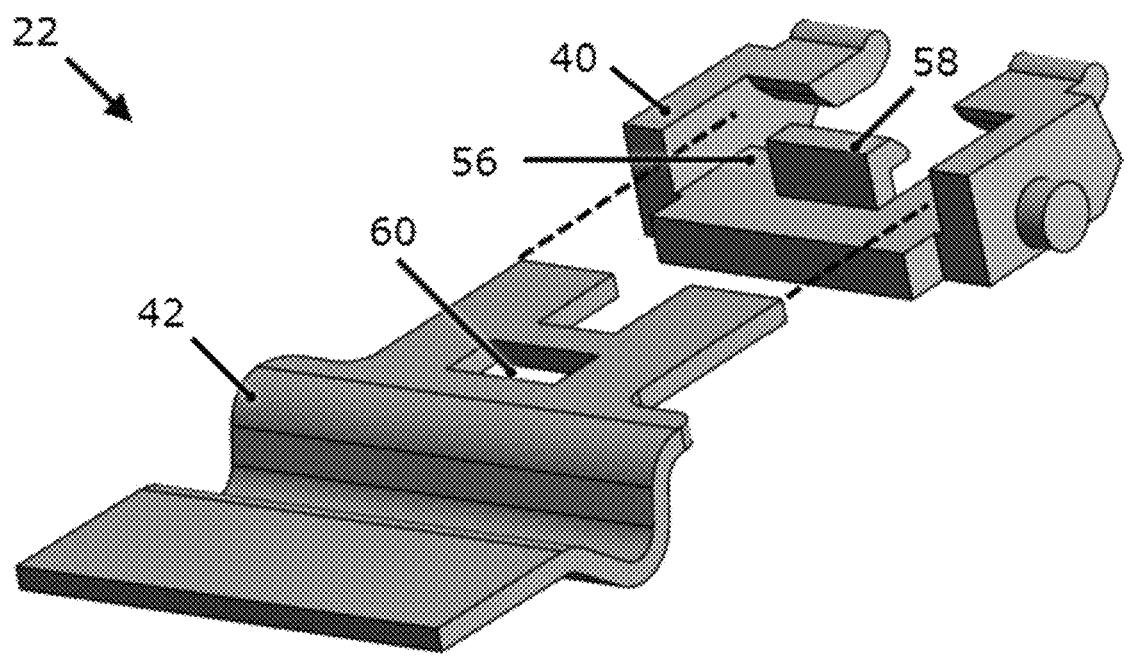

In at least one embodiment, the inner clamp jaw 22 may comprise an inner clamp body 40 that pivotably mounts to the inner frame and a detachable inner clamp bracket 42 that engages with the inner side of the leg mounting point 18. In a further embodiment and with reference to FIG. 9, the inner clamp body 40 may comprise a slot 56 that receives the detachable inner clamp bracket 42, and a hook-shaped locking protrusion 58 that engages with an aperture 60 in the detachable inner clamp bracket 42 when it is within the slot 56.

Figure 10:
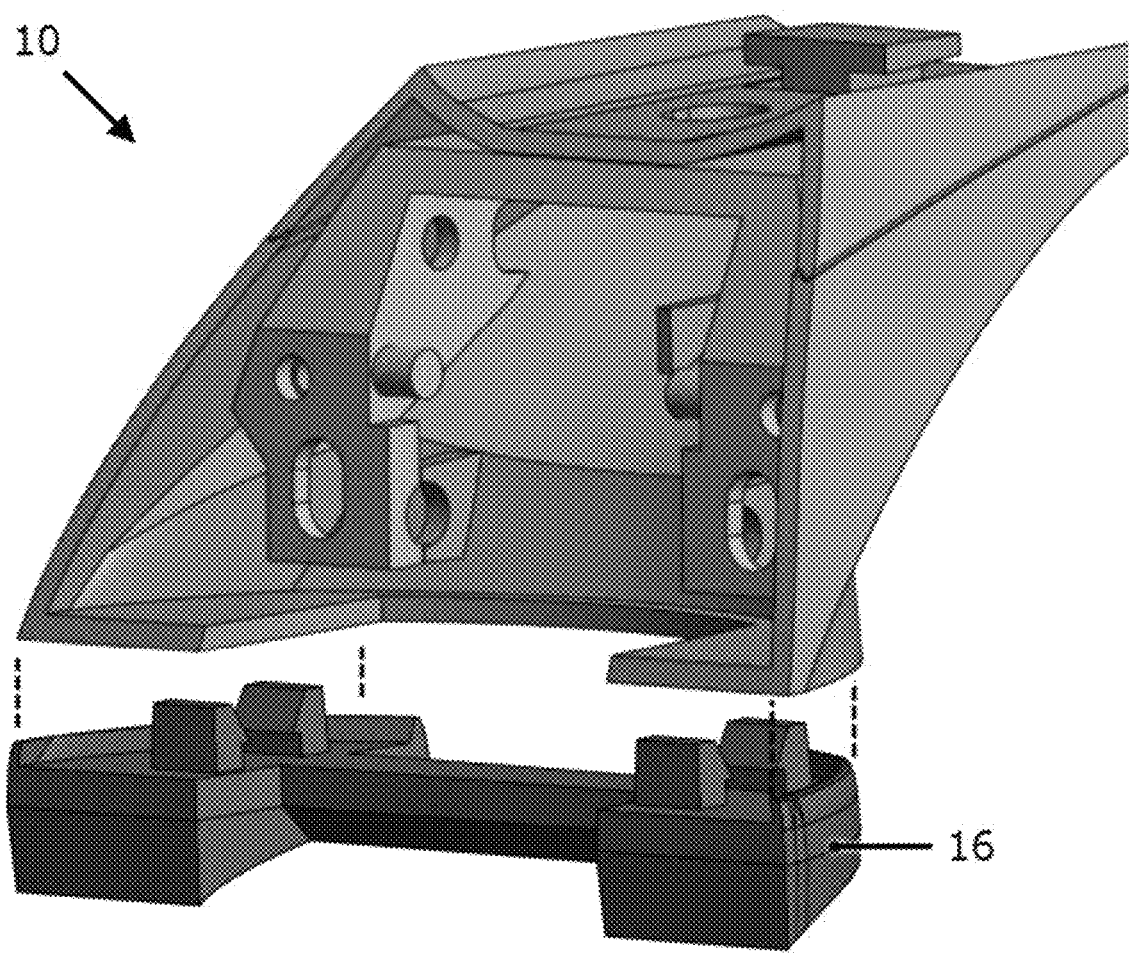
FIG. 10 depicts an embodiment of a leg frame.

In at least one embodiment and with reference to FIG. 10, the lower end 16 of the leg frame 10 may comprise one or more detachable pads that are shaped to be specific to an upper profile of the leg mounting point 18. In an alternate embodiment, the leg frame 10 may comprise an inner common frame and an outer shell that provides the lower end 16 that is configured to rest against the leg mounting point 18.

Figure 14:
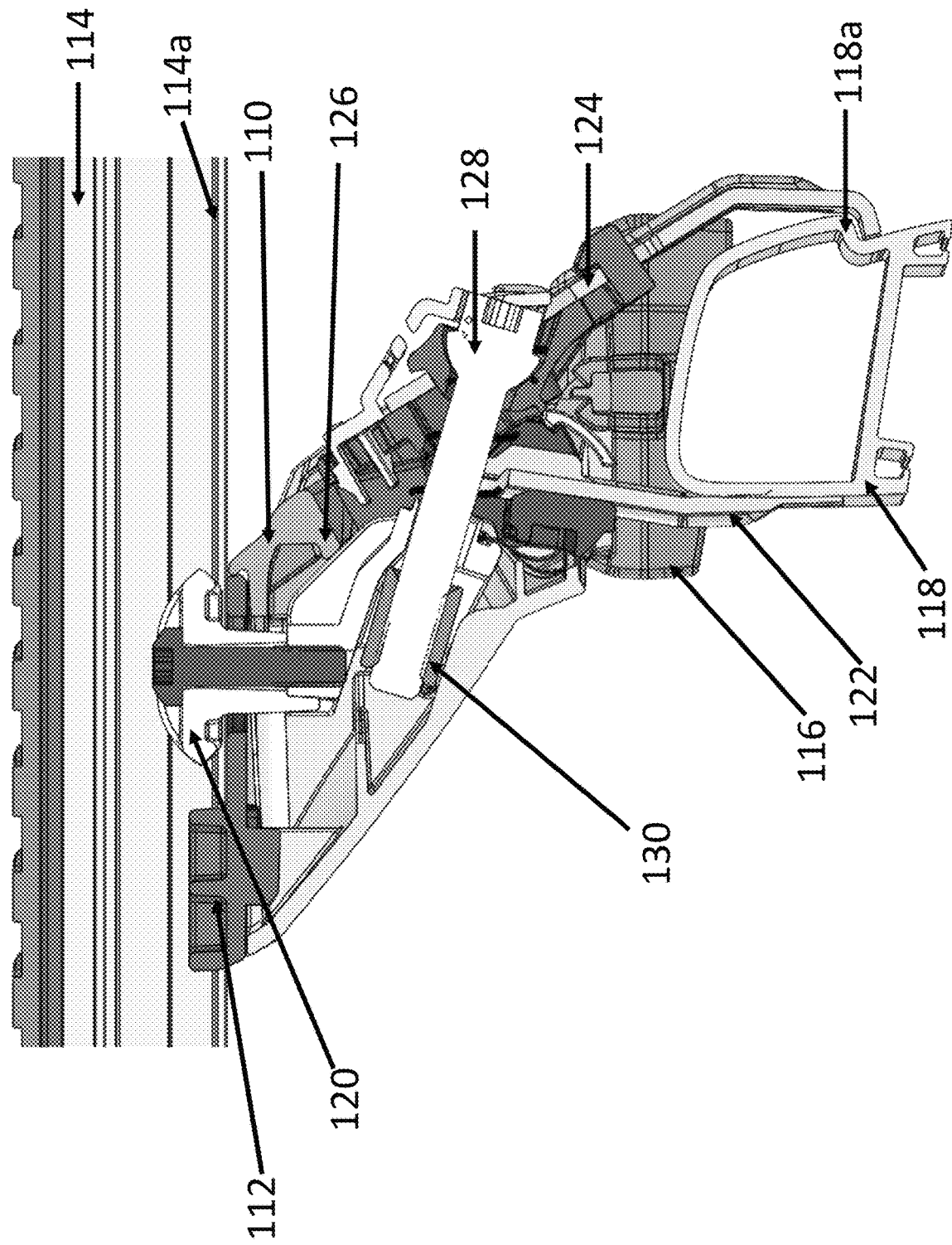
FIG. 14 depicts an embodiment of an article carrier mounting leg.

In another exemplary embodiment and with reference to FIG. 14, the present disclosure relates to an article carrier mounting leg, comprising a leg frame 110 having an upper end 112 (for example a bar adaptor) configured to receive a mounting portion 114a of an article carrier 114 thereupon, and a lower end 116 (for example a pad) configured to rest against a leg mounting point 118, an article carrier mounting element 120 (for example a cross bar spacer) configured to engage with the article carrier mounting portion 114a, an outer clamp jaw 124 movably connected to and outwardly extending from an outer clamp mounting point within the leg frame 110, and a threaded tightening mechanism (for example, a bolt) 128. The outer clamp jaw 124 is able to move between a first position and a second position, the first position comprising the outer clamp jaw 124 being distal to an outer surface of the leg mounting point 118, and the second position comprising the outer clamp jaw 124 being in contact with the outer surface of the leg mounting point 118.

The threaded tightening mechanism 128 is separable from the rest of the article carrier mounting leg. When the outer clamp jaw 124 is contacting against the mounting point outer side 118a, the threaded tightening mechanism 128 is able to be inserted to form an operable connection between the outer clamp jaw 124 and a threaded receiver 130. Once inserted and engaged with the threaded receiver 130, actuation of the threaded tightening mechanism 128 in a first direction induces tightening between the outer clamp jaw 124 and threaded receiver 130, thereby inducing a clamping engagement between the outer clamp jaw 124 and the mounting point outer side 118a.

The outer clamp jaw 124 is able to both pivot and slide about the outer clamp mounting point 126. In such an embodiment, actuation of the threaded tightening mechanism 128 to induce a clamping engagement comprises the outer clamp jaw 124 sliding diagonally upwards, such that a lower bracket portion 136 may engage or engages with the mounting point outer side 118a. This may be of use where the mounting point outer side 118a is not a uniform surface.

Figure 15:
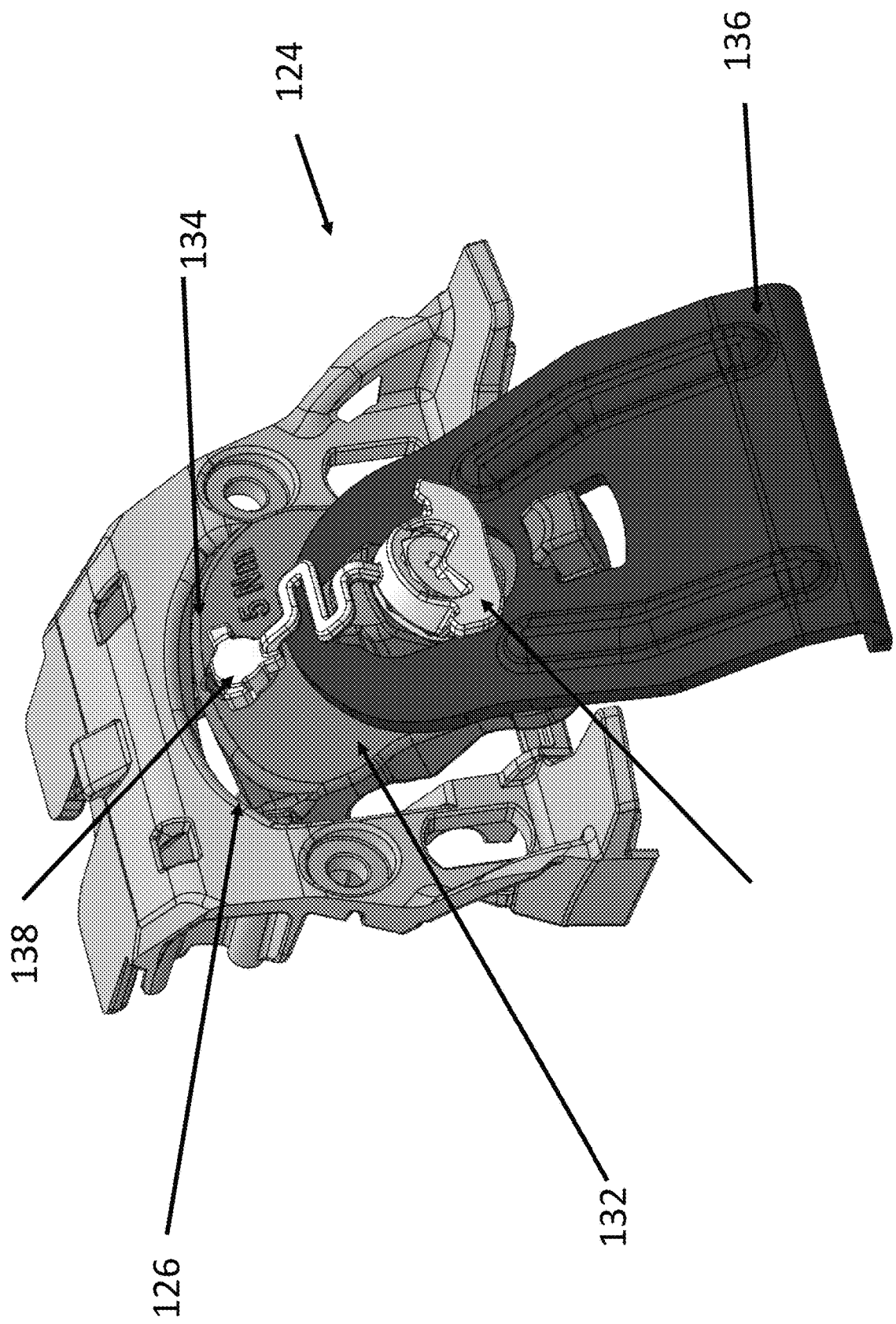
FIG. 15, 16, 17 depict embodiments of an outer and inner clamp jaw.

With reference to FIG. 15 the outer clamp jaw 124 comprises a clamp body portion 132 having an aperture that the threaded tightening mechanism 128 (FIG. 14) is inserted therethrough. The outer clamp jaw 124 may additionally comprise a pivoting portion at a first end of the clamp body portion 132, which is shaped to pivot about the outer clamp mounting point, and a bracket portion 136, for engaging with the mounting point outer side 118a (FIG. 14), which extends from a second end of the clamp body portion 132.

The pivoting portion 134 may be a slidable pivoting portion, such that the outer clamp jaw 124 is able to both slide relative to, and pivot about, the outer clamp mounting point 126. Following engagement of the threaded tightening mechanism 128 through the outer clamp jaw 124 and with the threaded receiver 130 (FIG. 14), tightening of the threaded tightening mechanism 128 (i.e., actuation in the first direction) may cause the outer clamp jaw 124 to slide inwards so as to clamp against the mounting point outer side 118a. The outer clamp jaw 124 is able to slide inwards, the direction in which the outer clamp jaw 124 slides may not be horizontal.

The outer clamp mounting point 126 (FIG. 16) may comprise a fulcrum portion, and the pivoting portion 134 may comprise a curved flange having a concave surface that bears against the fulcrum portion. The radius of curvature of the concave surface of the pivoting portion 134 is greater or substantially greater than a radius of curvature of the fulcrum portion of the outer clamp mounting point 126, thereby enabling the outer clamp jaw 124 to slide as well as pivot about the outer clamp mounting point 126.

Figure 16:
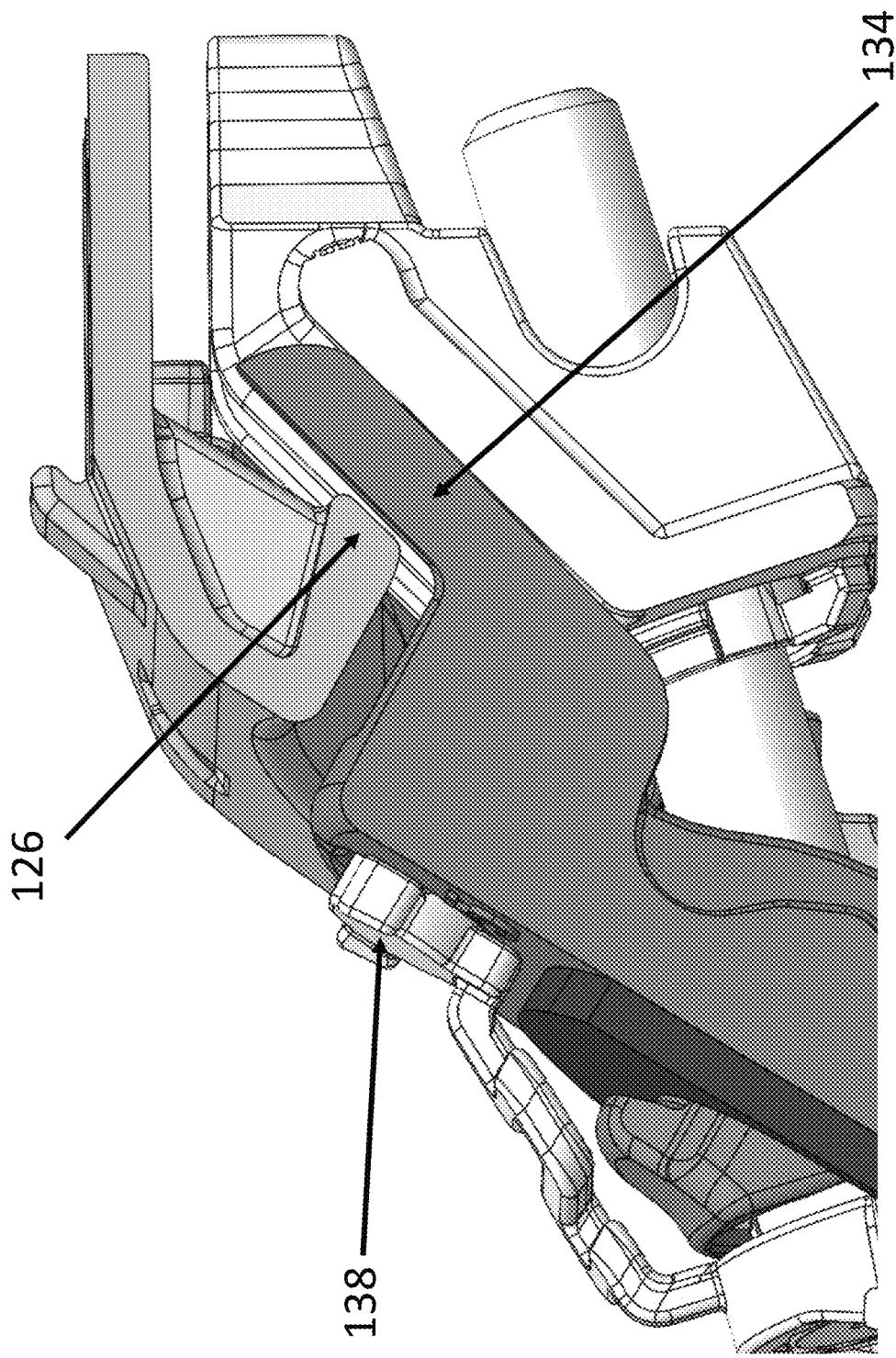
Figure 17:
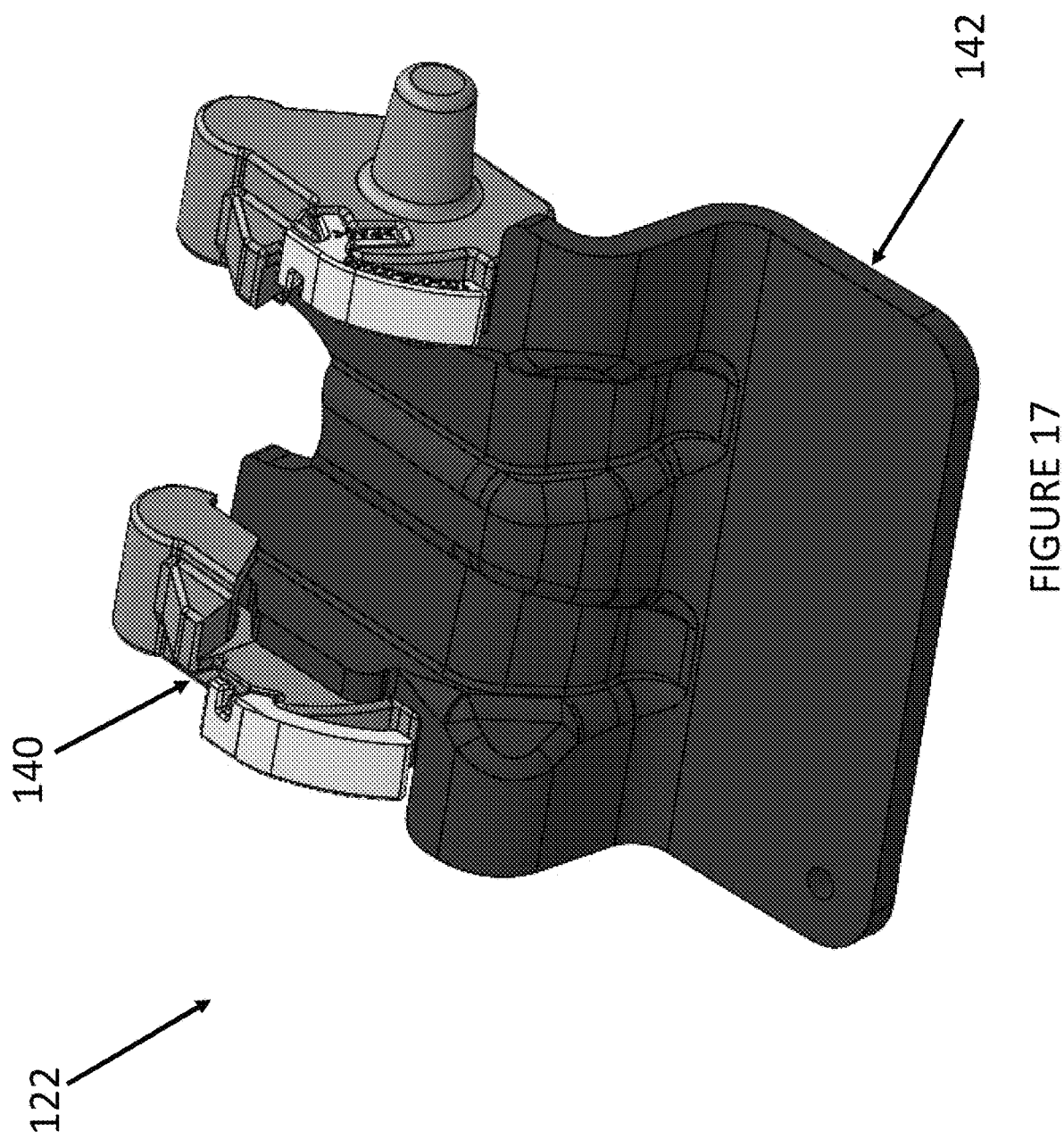

In an alternate embodiment, and as depicted in FIG. 16, the fulcrum portion 126 may comprise a protrusion extending from the leg frame to provide a curved bearing surface for the concave surface of the pivoting portion of the outer clamp jaw to bear against.

The outer clamp jaw 124 could be fully removed from the article carrier mounting leg for, e.g., maintenance or cleaning. This may also enable the outer clamp jaw 124 having a bracket portion 136 that conforms to a particular leg mounting point profile be swapped out for an outer clamp jaw 124 conforming to a different leg mounting point profile.

The outer clamp jaw 124 receives the threaded tightening mechanism 128 therethrough. The aperture that the threaded tightening mechanism 128 extends through is not necessarily a threaded aperture 148 (FIG. 19).

Figure 18:
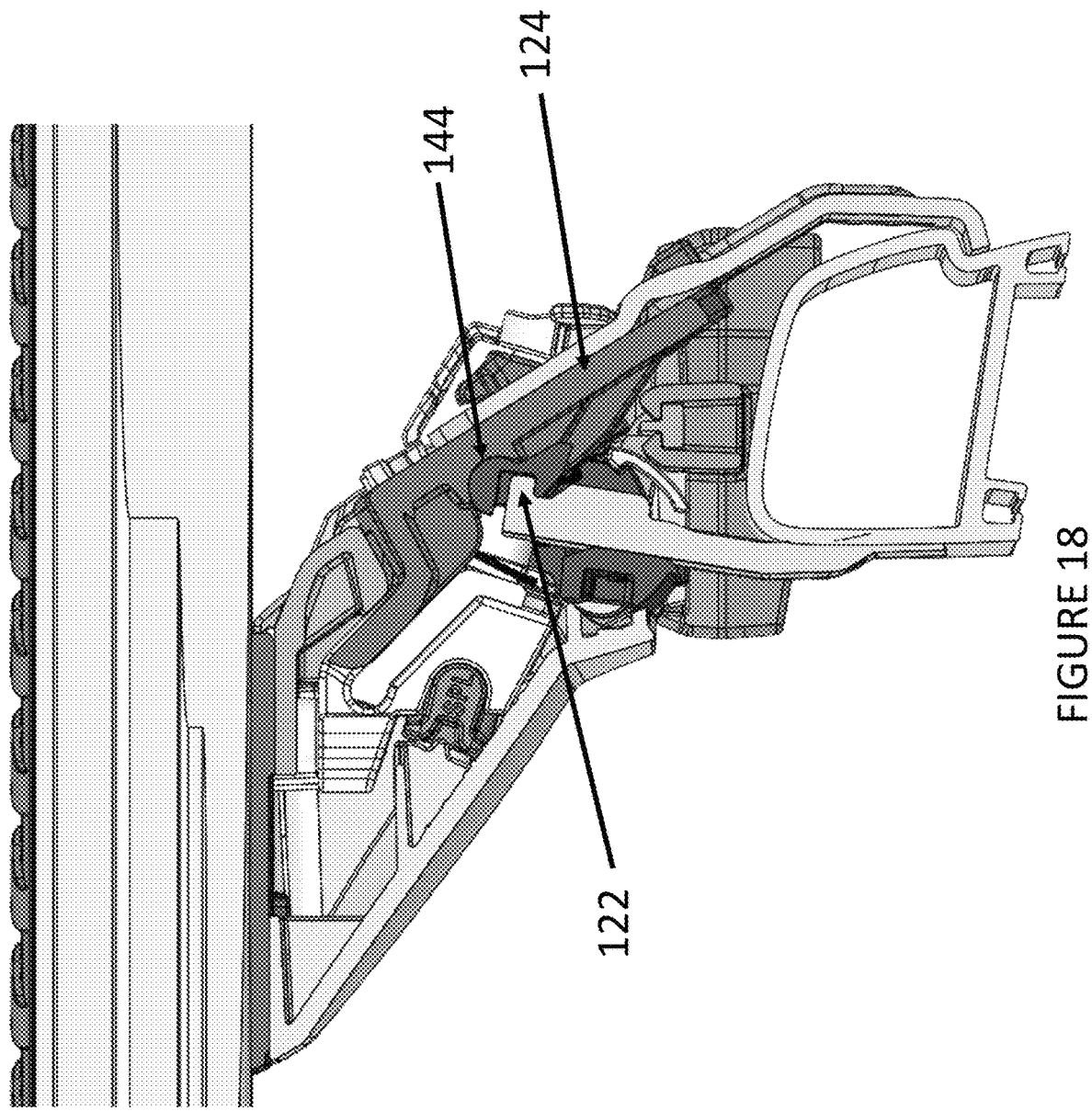
FIG. 18 depicts an embodiment of how the inner clamp jaw is actuated.

In at least one alternate embodiment and with reference to FIG. 18, the inner clamp jaw 122 may be pivotably mounted to the leg frame 110. In a further embodiment, movement of the inner clamp jaw 122 may be driven by the outer clamp jaw 124. In one such exemplary embodiment, the inner clamp jaw 122 may comprise an upper portion that is on an opposing side of the pivot point of the inner clamp jaw 122 from the inner clamp bracket portion 142. As depicted in FIG. 18, as the outer clamp jaw 124 moves inwards, a portion thereof may contact 144 against the upper portion of the inner clamp jaw 122, pushing it. This may in turn urge the inner clamp bracket portion 142 against the rail so as to provide a clamping force thereagainst.

Figure 19:
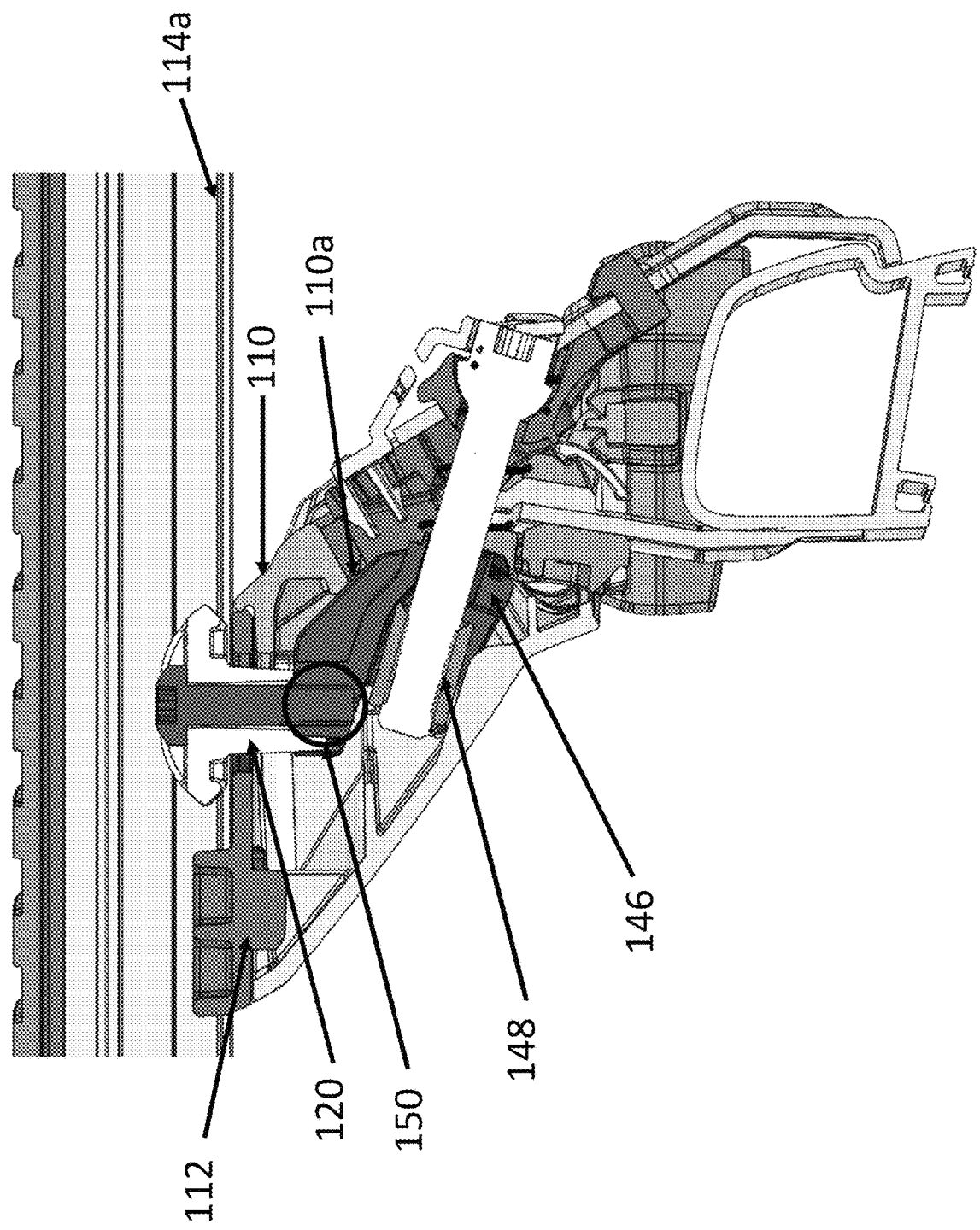
FIGS. 19 & 20 depicts an embodiment of a threaded receiver.

In at least one embodiment and with reference to FIG. 19, the leg frame 110 may comprise an inclined surface 110a. The threaded receiver 130 (FIG. 14) may comprise a sliding body 146 (for example, a wedge) that is arranged to slide within the leg frame 110, with the inclined surface being a lowermost limit upon the sliding movement thereof. The sliding body 146 may further comprise a threaded aperture 148 that receives the second end portion of the threaded tightening mechanism 128 (FIG. 14). In such an embodiment, actuation of the threaded tightening mechanism 128 in the first direction may urge the threaded receiver 130 and the outer clamp jaw 124 towards one another.

In some embodiments wherein the outer clamp jaw 124 comprises a pivoting portion 134 (FIG. 15) having a curved flange, the outer convex surface thereof may bear against an upper surface of the sliding body 146. The sliding body 146 may act as a wedge between the inclined surface 110a and the curved flange of the outer clamp jaw 124, so as to promote an upwards, diagonal or inclined sliding movement of the outer clamp jaw 124 as it is drawn inwards. As previously noted, inclined movement is considered to be of benefit in embodiments wherein the profile of the leg mounting point 118 comprises a lip on the outer side, as the diagonal sliding motion may promote optimal clamping engagement between the bracket portion 136 and the lip of the mounting point outer side 118a.

Figure 20:
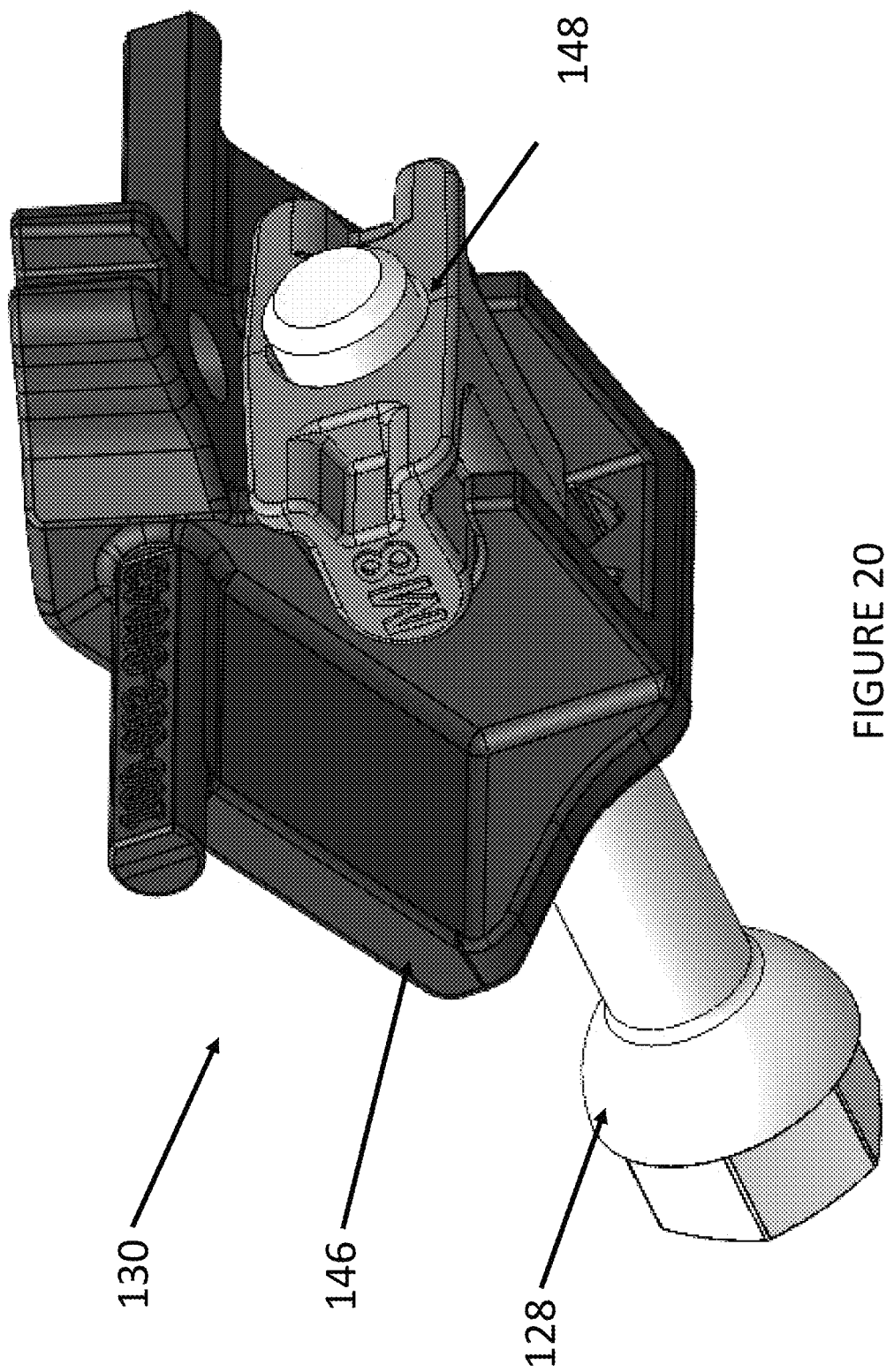

In at least one further embodiment and with reference to FIG. 20, the threaded aperture 148 of the threaded receiver 130 may be provided by a pivotable threaded nut. The pivotable threaded nut may attach, rest or otherwise bear against a pivot point on the sliding body 146. The threaded nut may be positioned on a side of the sliding body 146 distal to the outer clamp jaw 124, or otherwise is positioned so that actuation of a received threaded tightening mechanism 128 in the first direction (i.e., tightening) may pull the pivotable threaded nut against the sliding body 146.

With return reference to FIG. 19, in an embodiment wherein the threaded receiver 130 comprises a sliding body 146, the article carrier mounting element 120 may comprise a lower end portion 150 that is mechanically connected to the sliding body 146 of the threaded receiver 130. In such an embodiment, when the threaded tightening mechanism 128 is actuated in a first direction and the sliding body 146 and the outer clamp jaw 124 are urged towards one another, the movement of the sliding body 146 may the pull the article carrier mounting element 120 downwards. This may subsequently pull the article carrier mounting portion 114a against the upper end 112 of the leg frame 110.

A moving/withdrawing article carrier mounting element 120 may be of carrier 114 thereto, with the downwards movement of the article carrier mounting element 120 serving to close off access to the article carrier mounting portion 114a mounting element 120. Additionally, in embodiments wherein the engaging portion of the article carrier mounting element 120 is a clamping-type engaging portion, clamping engagement of the article carrier 114 to the upper end 112 of the article carrier mounting leg may be enabled by the downwards movement of the article carrier mounting element 120. One such example is depicted in FIG. 19, wherein the article carrier 114 is held in engagement by clamping between a flat, horizontally-extending upper end of the article carrier mounting element 120 and the upper end 112 of the leg frame 110.

Figure 21:
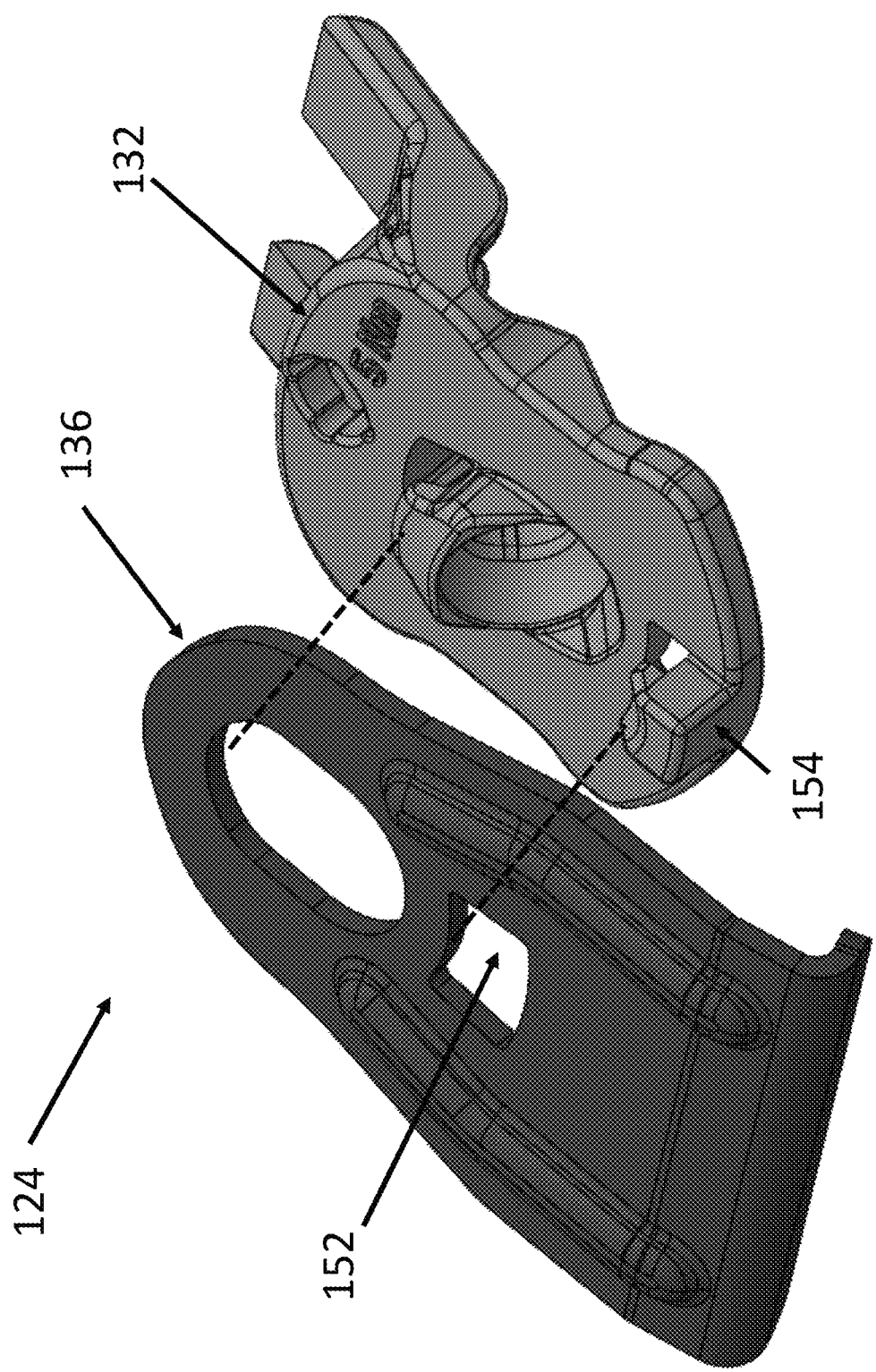
FIGS. 21 & 22 depict further embodiments of the outer and inner clamp jaw

In such an embodiment and as depicted in FIG. 21, the clamp body portion 132 may comprise at least one hooked locking protrusion 1 54 that engages with the aperture 152 of the detachable bracket. In a further embodiment wherein the outer clamp jaw 124 further comprises a curved flange and detachable retaining element 138 (FIG. 15), attachment of the retaining element 138 to the clamp body portion 132 may also serve to maintain the aperture 152 of the detachable bracket and the hook-shaped locking protrusion 154 of the clamp body portion 132 in engagement with one another.

Figure 22:
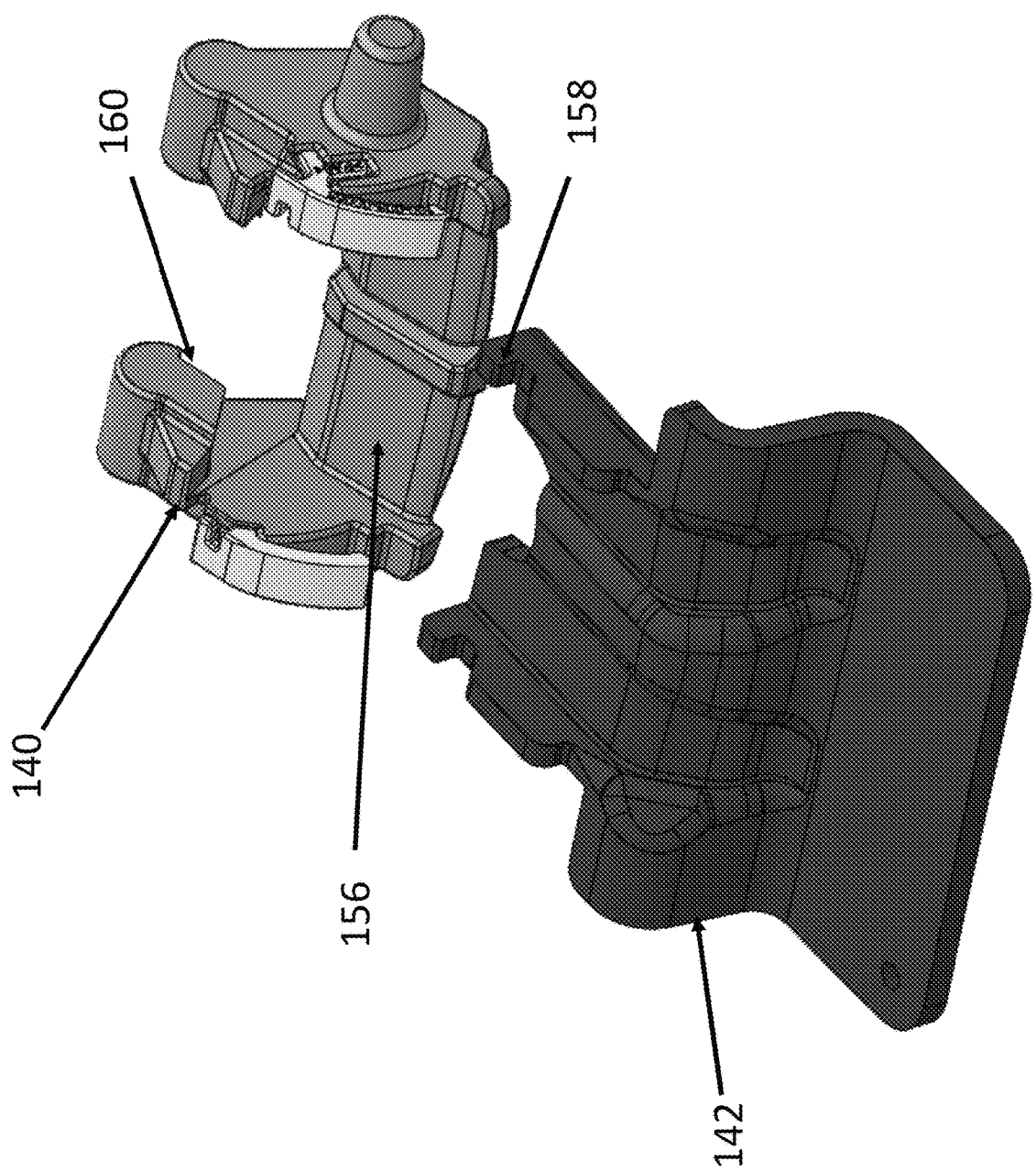

In at least one embodiment, the inner clamp jaw 122 may comprise an inner clamp body 140 (FIG. 22) that pivotably mounts to the inner frame and a detachable inner clamp bracket 142 (FIG. 22) that engages with the inner side of the leg mounting point 118. In a further embodiment and with reference to FIG. 22, the inner clamp body 1 40 may comprise a slot 156 that receives the detachable inner clamp bracket 142, and a hook-shaped locking protrusion 158 that engages with an aperture 160 in the detachable inner clamp bracket 142 when it is within the slot 156.

Figure 23:
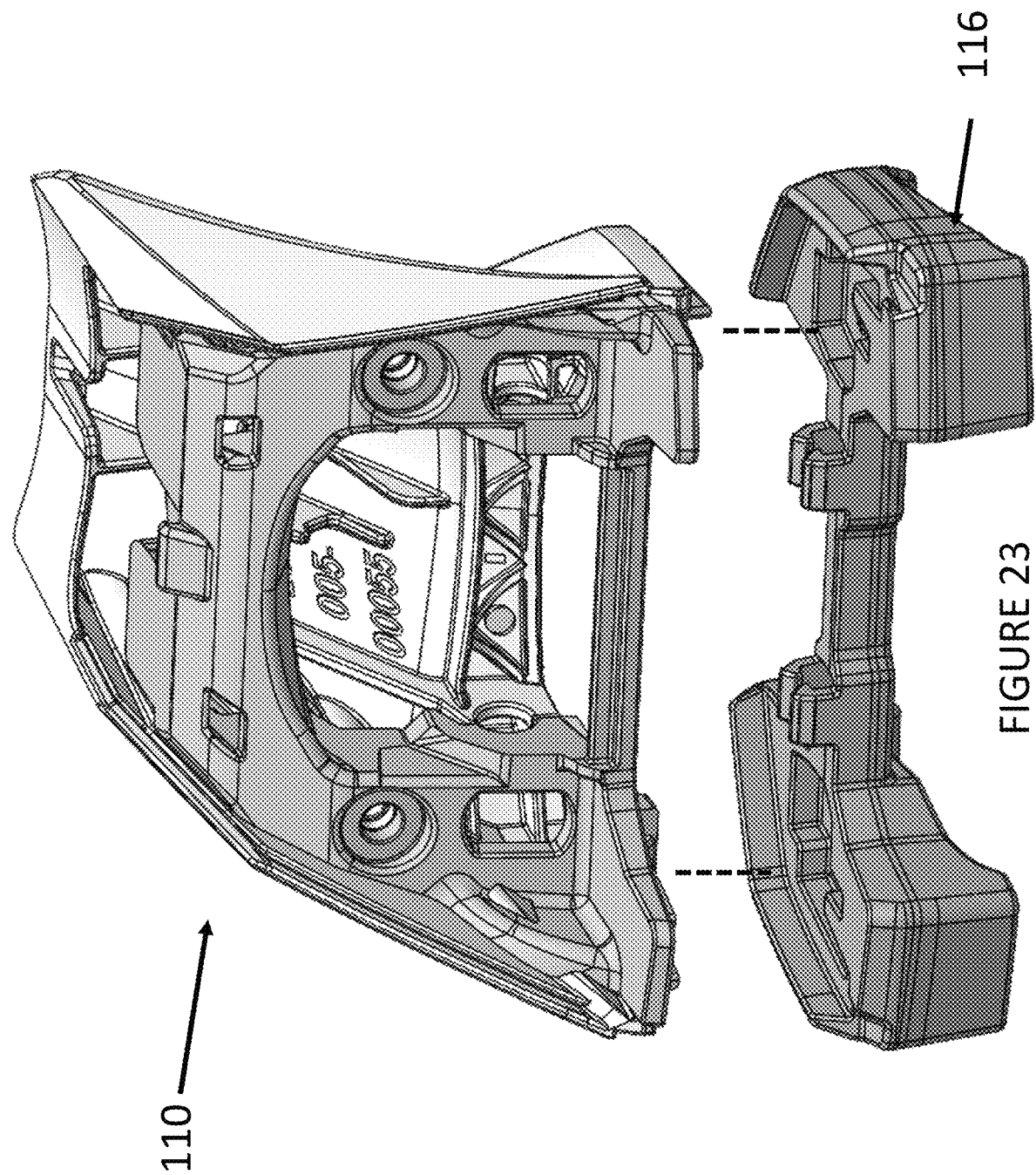
FIG. 23 depicts an embodiment of a leg frame.

In at least one embodiment and with reference to FIG. 23, the lower end 116 of the leg frame 110 may comprise one or more detachable pads that are shaped to be specific to an upper profile of the leg mounting point 118. In an alternate embodiment, the leg frame 110 may comprise an inner common frame and an outer shell that provides the lower end 116 that is configured to rest against the leg mounting point 118.

An alternate embodiment of the present disclosure may comprise an article carrier mounting leg having a leg frame having an upper end configured to receive a mounting portion of an article carrier thereupon, and a lower end configured to rest against a leg mounting point, an article carrier mounting element configured to engage with the article carrier mounting portion, a threaded receiver comprising a sliding body and a threaded aperture, and a threaded tightening mechanism in engagement with the threaded aperture of the threaded receiver.

In at least one embodiment, the threaded tightening mechanism may be arranged such that rotating the threaded tightening mechanism urges the threaded receiver to move therealong in a first direction, while contra-rotation urges the threaded receiver to move therealong in an opposing second direction. In at least one embodiment, the article carrier mounting element may comprise an engaging portion that engages with the mounting portion of the article carrier and being mechanically connected to the sliding body of the threaded receiver, for example, via pin, bolt, screw, other form of fastener, by a portion extending therefrom or combinations thereof. In such an embodiment, movement of the threaded receiver in the first direction pulls the article carrier mounting portion against the upper end of the leg frame.

One of ordinary skill in the art will appreciate that the present embodiment is an adaptation of other disclosed embodiments, comprising a similar core of a moving internal element (e.g., the threaded receiver), and movement thereof induces a pulling or clamping action between the article carrier and the upper end of the leg frame.

Methods of Operation

With the structural elements of various embodiments of the article carrier mounting leg defined, it may be beneficial to describe a method of operation thereof. As such, in a second aspect the present disclosure may comprise a method of operation of an article carrier mounting leg, such as an embodiment of the article carrier mounting leg described previously.

Figure 11:
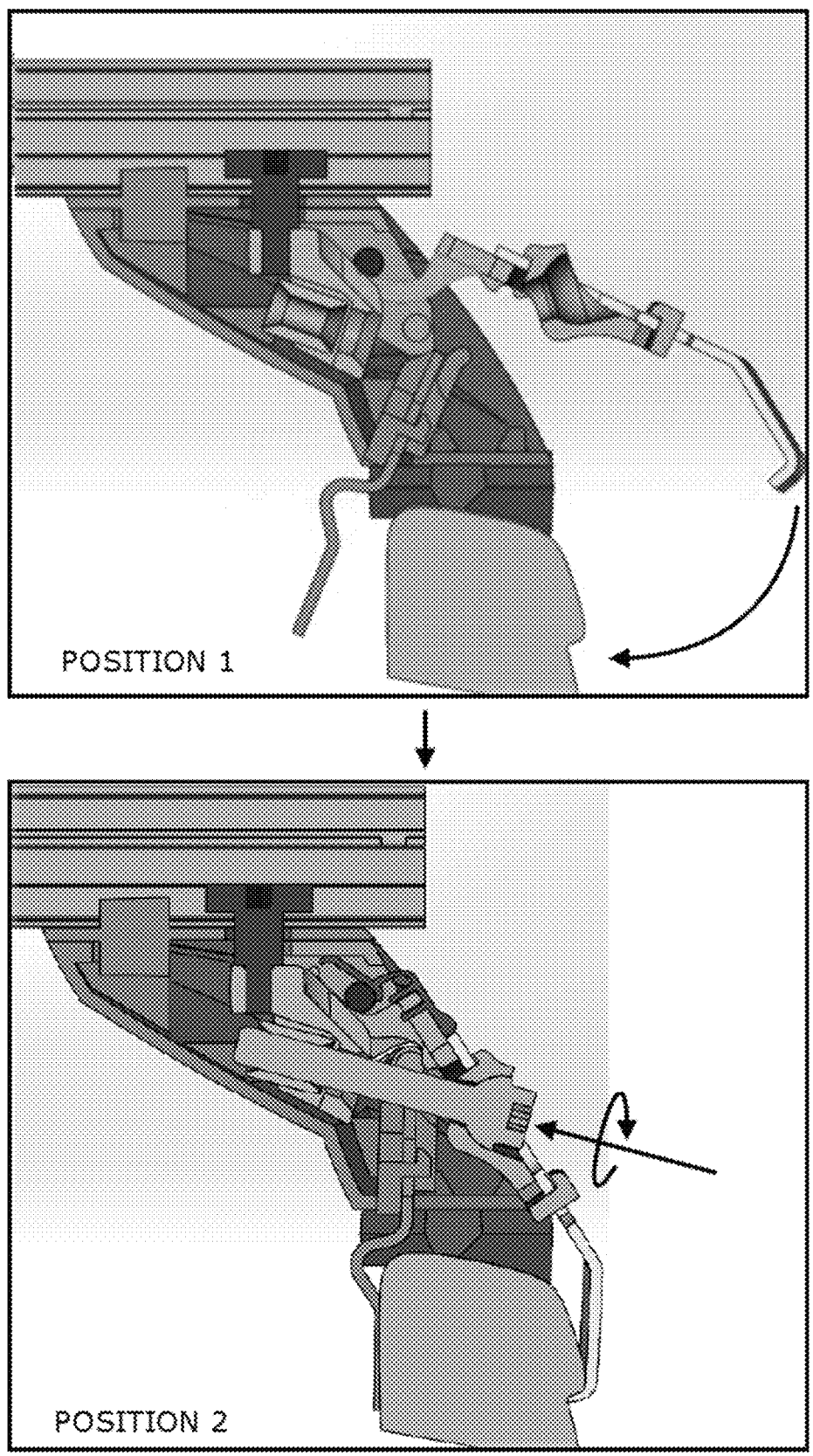
FIGS. 11-13 depict various modes of operation of certain embodiments.

In at least one embodiment and with reference to FIG. 11, the method of attaching an article carrier mounting leg to a leg mounting point 18 may comprise the steps of:
  i. positioning the article carrier mounting leg such that a lower end 16 of a leg frame 10 thereof rests against the leg mounting point 18;
  ii. arranging a mounting portion of an article carrier 14 to be in engagement with an article carrier mounting element 20 of the article carrier mounting leg, proximal to an upper end 12 of the article carrier mounting leg configured to receive the mounting portion;

iii. pivoting an outer clamp jaw 24 that is movably connected to an outer clamp mounting point within the leg frame 10 from a first position to a second position; and iv. inserting a threaded tightening mechanism 28 through the outer clamp jaw 24 and into engagement with a threaded receiver 30.

In the above embodiment, "first position" refers to the outer clamp jaw 24 being distal to an outer surface of the leg mounting point 18, while "second position" refers to the outer clamp jaw 24 being in contact with the outer surface of the leg mounting point 18. The step of inserting the threaded tightening mechanism 28 into engagement with the threaded receiver 30 may comprise the threaded tightening mechanism 28 being tightened with respect thereto, such that the outer clamp jaw 24 which is in contact with the mounting point outer side 18*a* clamps thereagainst.

Figure 12:
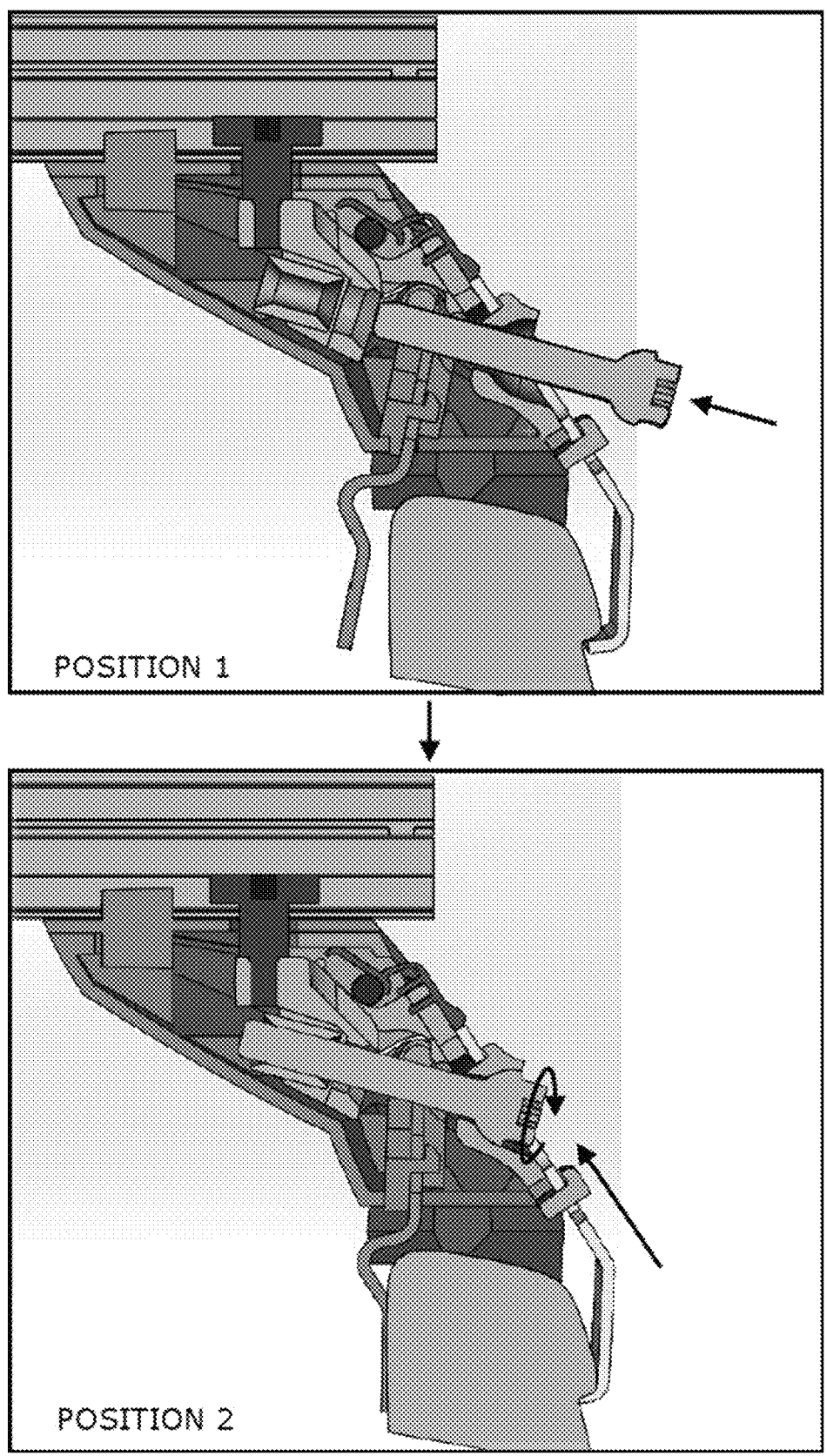

In an alternate embodiment and with reference to FIG. 12, the method of attaching an article carrier mounting leg to a leg mounting point 18 may comprise the steps of:

i. positioning the article carrier mounting leg such that a lower end 16 of a leg frame 10 thereof rests against the leg mounting point 18;

ii. arranging a mounting portion of an article carrier 14 to be in engagement with an article carrier mounting element 20 of the article carrier mounting leg, proximal to an upper end 12 of the article carrier mounting leg configured to receive the mounting portion; and iii. actuating a threaded tightening mechanism 28 of the article carrier mounting leg, which extends through an outer clamp jaw 24 movably connected to an outer clamp mounting point within the leg frame 10 and into engagement with a threaded receiver 30, in a first direction, such that the outer clamp jaw 24 is urged to slide from a first position to a second position.

In the above embodiment, "first position" refers to the outer clamp jaw 24 being in loose contact with an outer surface of the leg mounting point 18, while "second position" refers to the outer clamp jaw 24 being in clamping contact with the outer surface of the leg mounting point 18.

Figure 13:
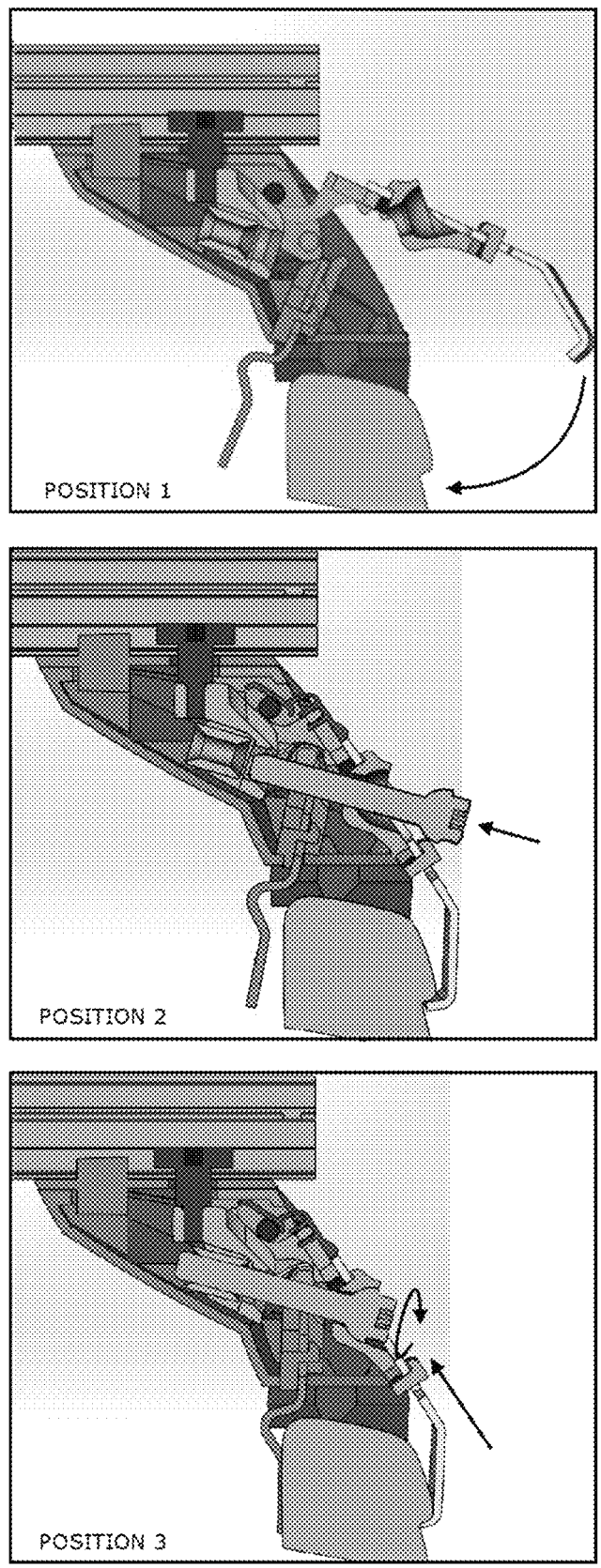

In a further alternate embodiment and with reference to FIG. 13, the method of attaching an article carrier mounting leg to a leg mounting point 18 may comprise the steps of:

i. positioning the article carrier mounting leg such that a lower end 16 of a leg frame 10 thereof rests against the leg mounting point 18;

ii. arranging a mounting portion of an article carrier 14 to be in engagement with an article carrier mounting element 20 of the article carrier mounting leg, proximal to an upper end 12 of the article carrier mounting leg configured to receive the mounting portion;

iii. pivoting an outer clamp jaw 24 that is movably connected to an outer clamp mounting point within the leg frame 10 from a first position to a second position;

iv. inserting a threaded tightening mechanism 28 through an aperture in the outer clamp jaw 24 and into engagement with a threaded receiver 30; and v. actuating the threaded tightening mechanism 28 in a first direction, such that the outer clamp jaw 24 is urged to slide from the second position to a third position.

In the above embodiment, "first position" refers to the outer clamp jaw 24 being distal to an outer surface of the leg mounting point 18, the "second position" refers to the outer clamp jaw 24 being in loose contact with an outer surface of the leg mounting point 18, and the "third position" comprises the outer clamp jaw 24 being in clamping contact with the outer surface of the leg mounting point 18.

The article carrier mounting leg of one or more of the above embodiments of the present disclosure second aspect of the present disclosure may be an embodiment of the article carrier mounting leg of the first aspect of the present disclosure. For example, in a further embodiment of either method, the article carrier mounting leg further may comprise an inner clamp jaw 22 that is pivotably mounted to the leg frame 10. The inner clamp jaw 22 may extend along an inner side of the leg mounting point 18. In a further embodiment, as the outer clamp jaw 24 moves from the first position to the second position, it may contact against an upper end 12 of the inner clamp jaw 22, which is thereby urged to pivot into engagement with the inner side of the leg mounting point 18. In an alternate further embodiment wherein the method comprises the outer clamp jaw 24 both pivoting and sliding, as the outer clamp jaw 24 pivots from the first position to the second position, it may contact an upper end 12 of the inner clamp jaw 22, and as the outer clamp jaw 24 subsequently slides from the second position to the third position, the inner clamp jaw 22 is urged to pivot into engagement with the inner side of the leg mounting point 18.

As a further example, the threaded receiver 30 may comprise a sliding body 46 and a threaded aperture 48 that receives an end portion of the threaded tightening mechanism 28. Actuation of the threaded tightening mechanism 28 in the first direction may urge the threaded receiver 30 and the outer clamp jaw 24 towards one another.

As a further example, the article carrier mounting element 20 may comprise a lower end portion 50 that is mechanically connected to the sliding body 46 of the threaded receiver 30, and an engaging portion that extends through the upper end 12 of the leg frame 10 and engages with the article carrier mounting portion 14*a*. In such an embodiment, urging the threaded receiver 30 and the outer clamp jaw 24 towards one another may pull the article carrier mounting portion 14*a* against the upper end 12 of the leg frame 10.

Figure 24B:
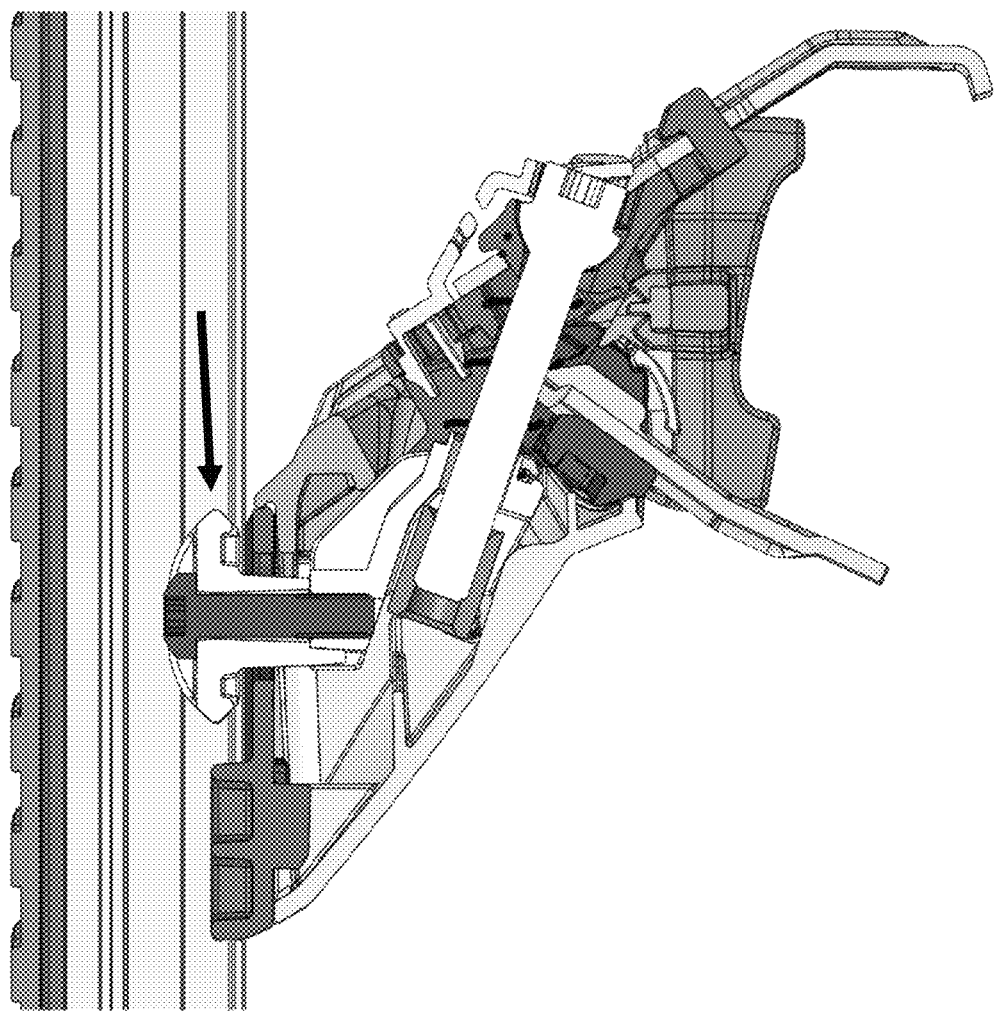
Figure 24C:
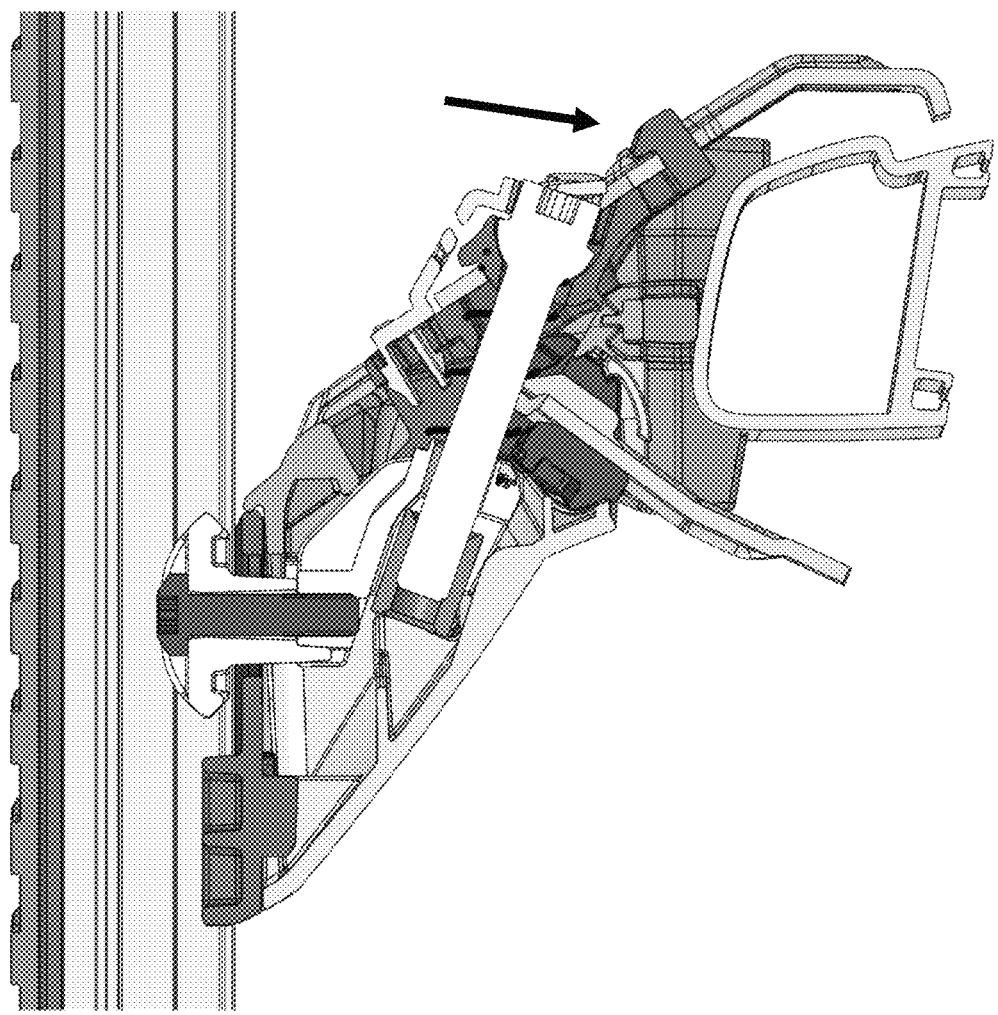
Figure 24D:
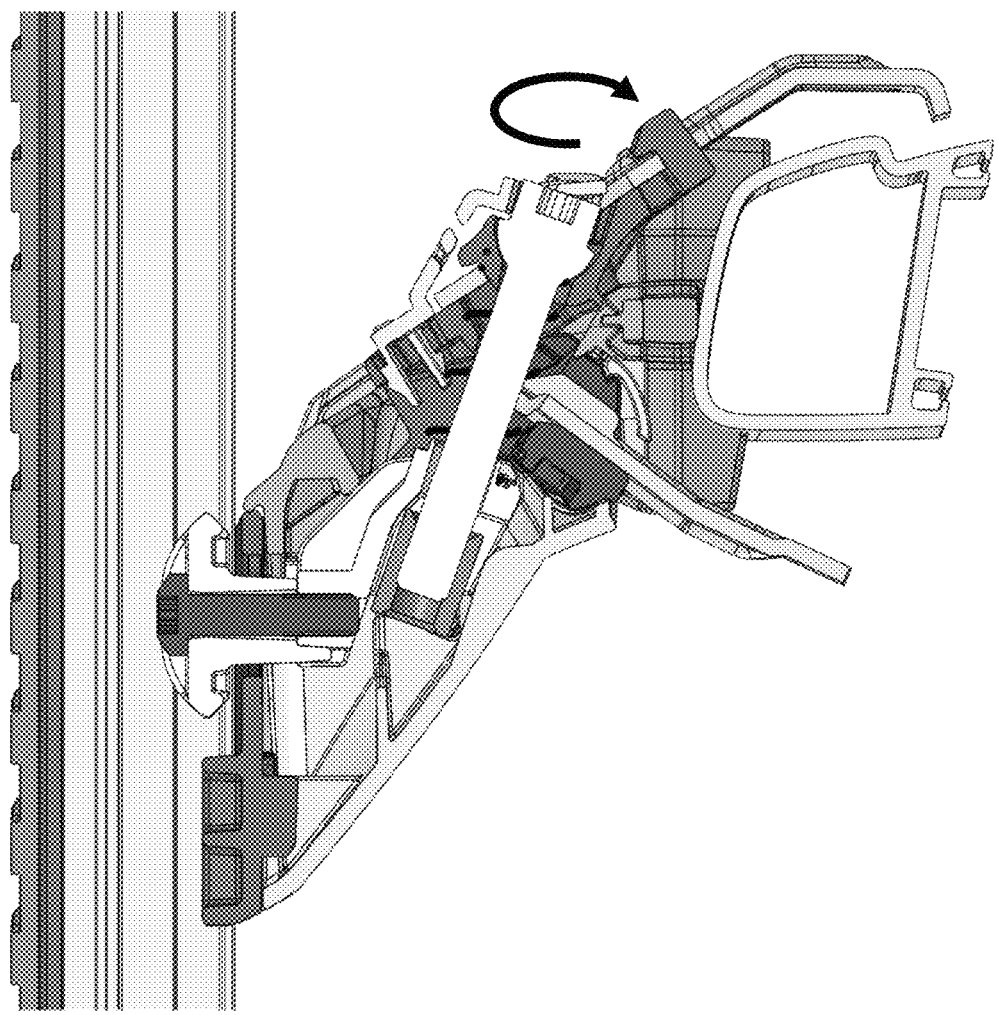
Figure 24E:
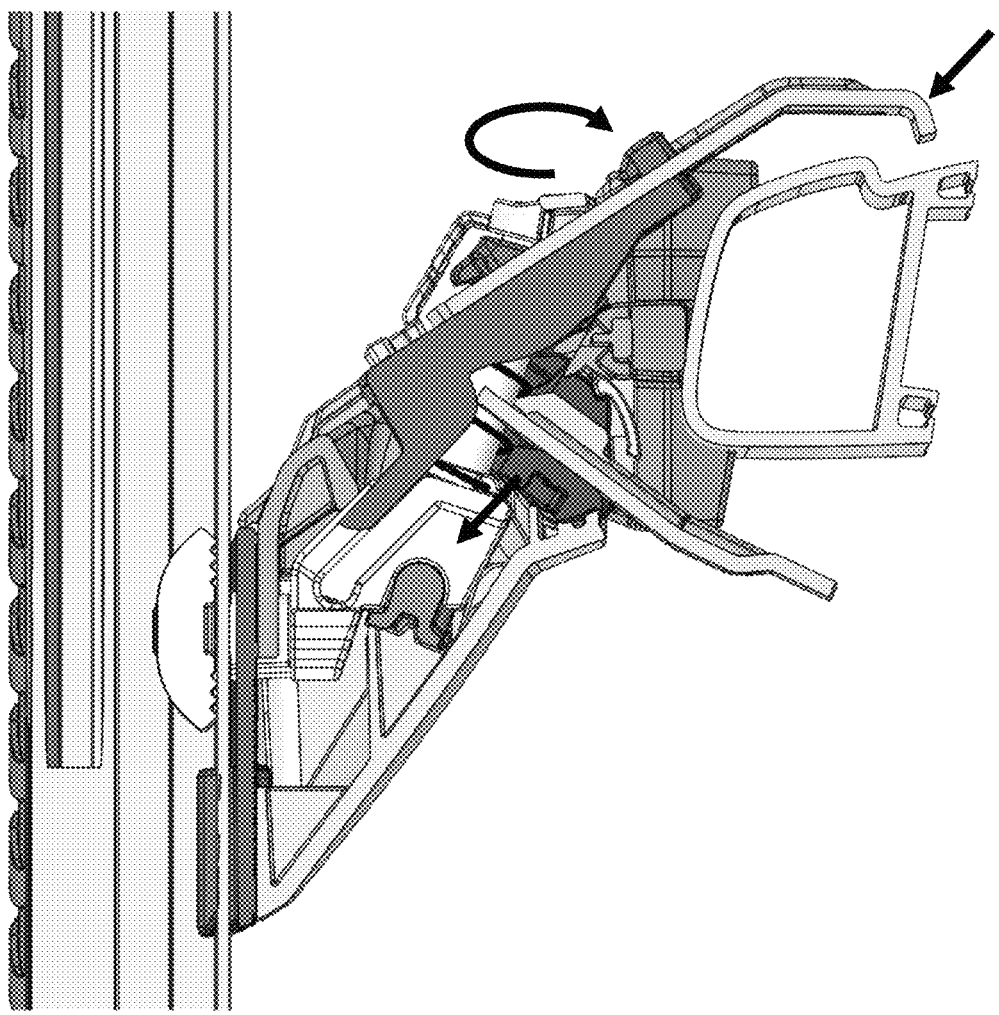
Figure 24F:
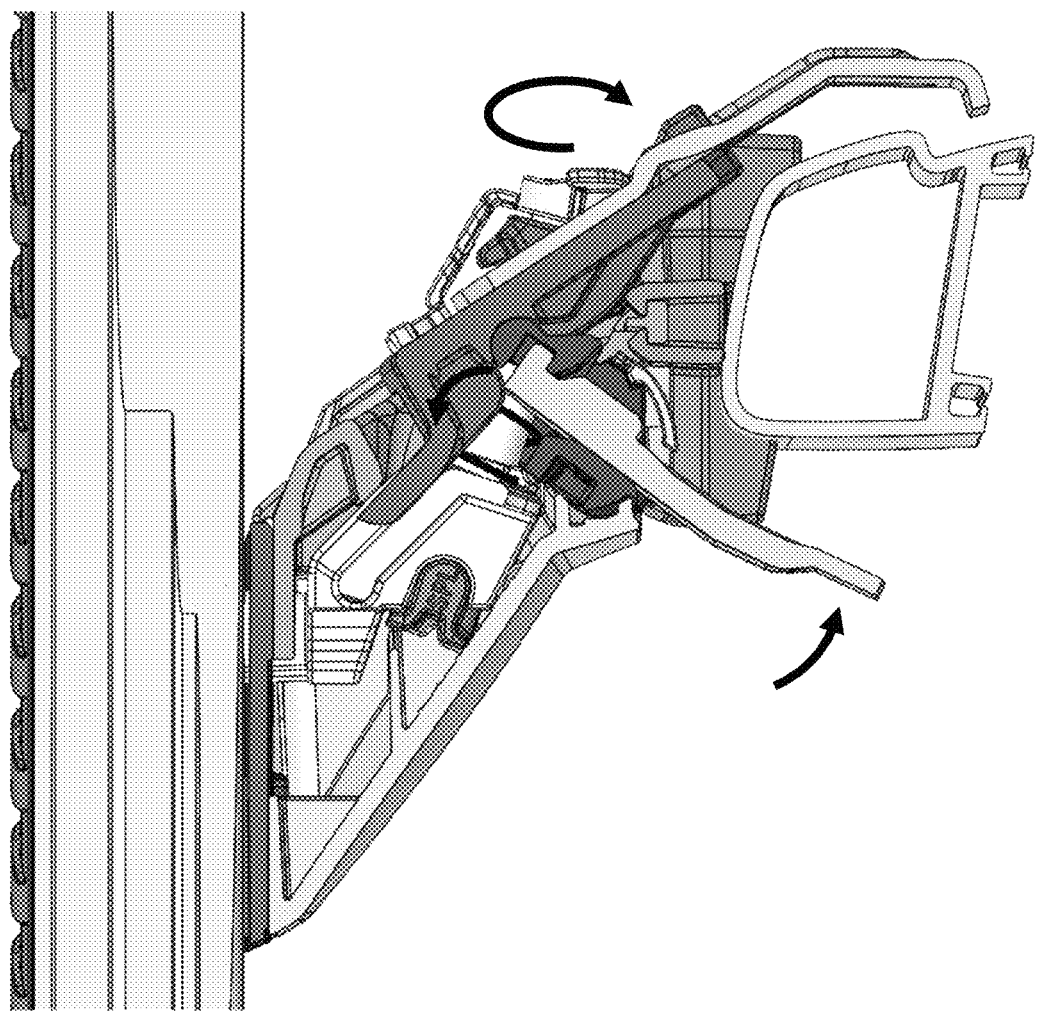
Figure 24G:
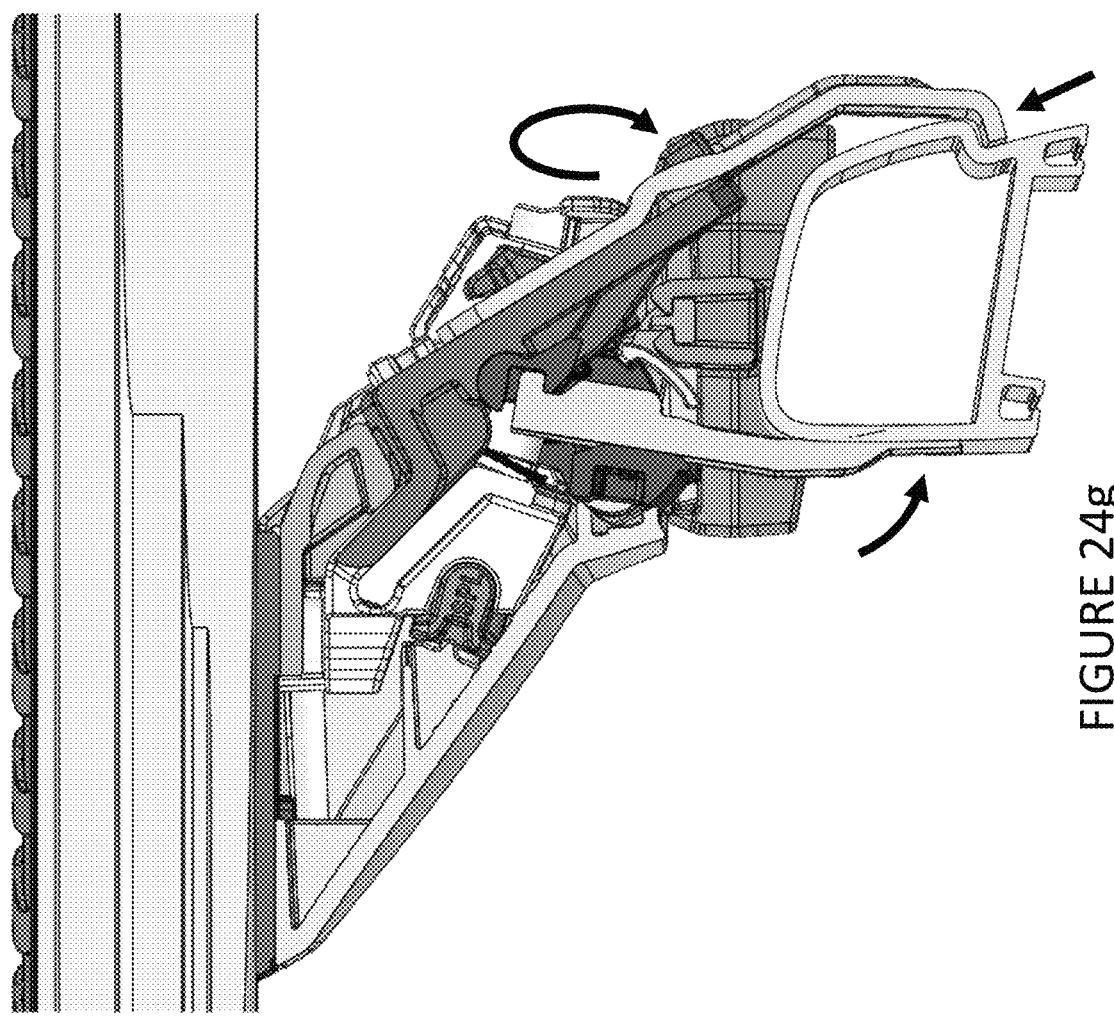

Another method of method of operation of an article carrier mounting leg is disclosed in FIGS. 24*a* to 24*j*. FIG. 24*a* illustrates the attachment of clamp jaws and pads. The top figure A is without the clamp jaws and pads and the bottom figure B is with the clamp jaws and pads attached. The tree arrows on the bottom figure are indicating the attachment. FIG. 24*b* illustrates the inserting of the article carrier mounting leg into the article carrier. The horizontal arrow is indicating that insertion. FIG. 24*c* illustrates placing the article carrier mounting leg on a vehicle and position the article carrier mount leg on the leg mounting point of the vehicle. The downward arrow is indicating that placement. FIG. 24*d* illustrates beginning to tighten the tightening mechanism 128. The circular arrow indicates that tightening. FIG. 24*e* illustrates continued tightening of the tightening mechanism 128 (circular arrow) that begins to move up the wedge block shown with the left arrow and the tightening also begins to move the outer clamp jaw 124 towards the mounting point outer side 118*a* shown with the arrow in lower portion of the figure. FIG. 24*f* illustrates continued tightening of the tightening mechanism 128 (circular arrow) while clamp holder slides up (top circular arrow) and a ball and socket joint swings the inner clamp jaw (bottom curved arrow) on the leg mounting point (for example, roof rail). FIG. 24*g* illustrates continued tightening of the tightening mechanism 128 (circular arrow) that causes the outer clamp jaw (right curved arrow) and the inner clamp jaw (left curved arrow) to make contact with the leg mounting point.

Figure 24H:
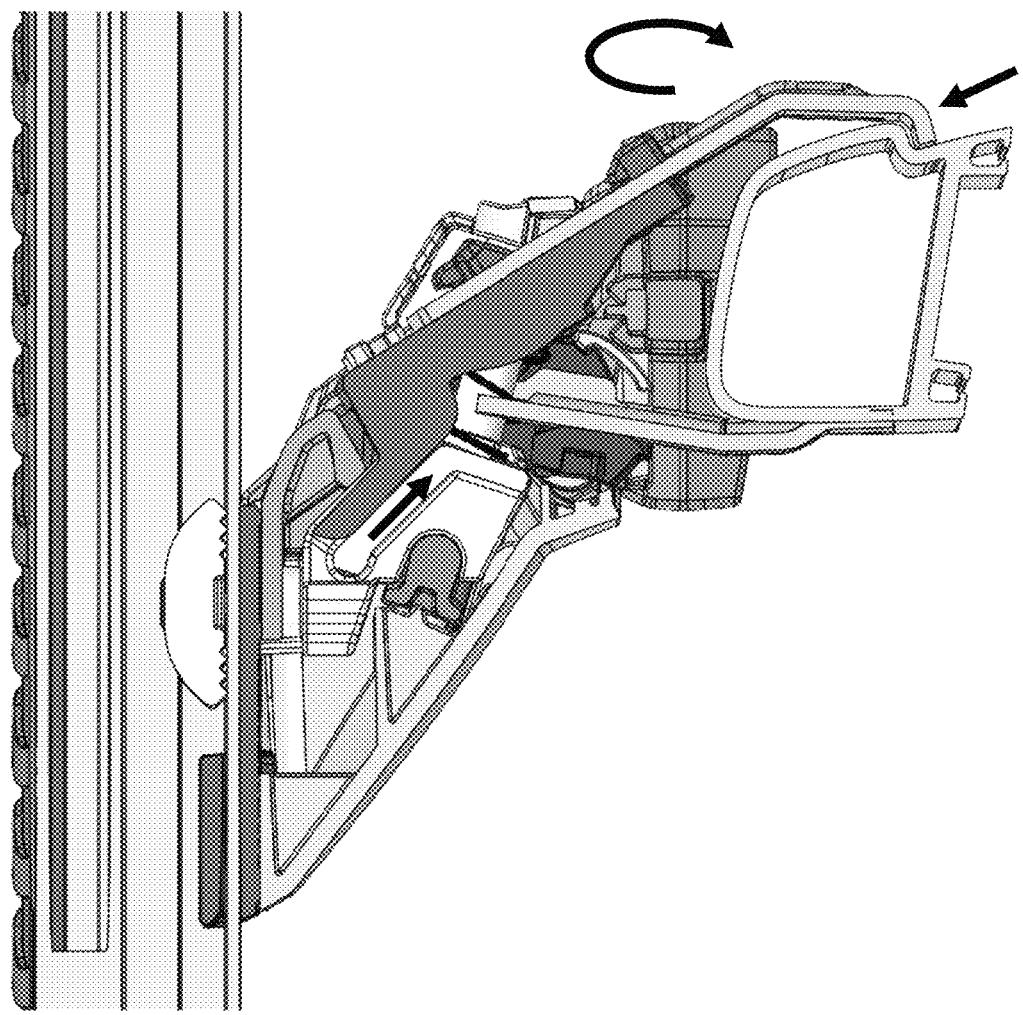
Figure 24I:
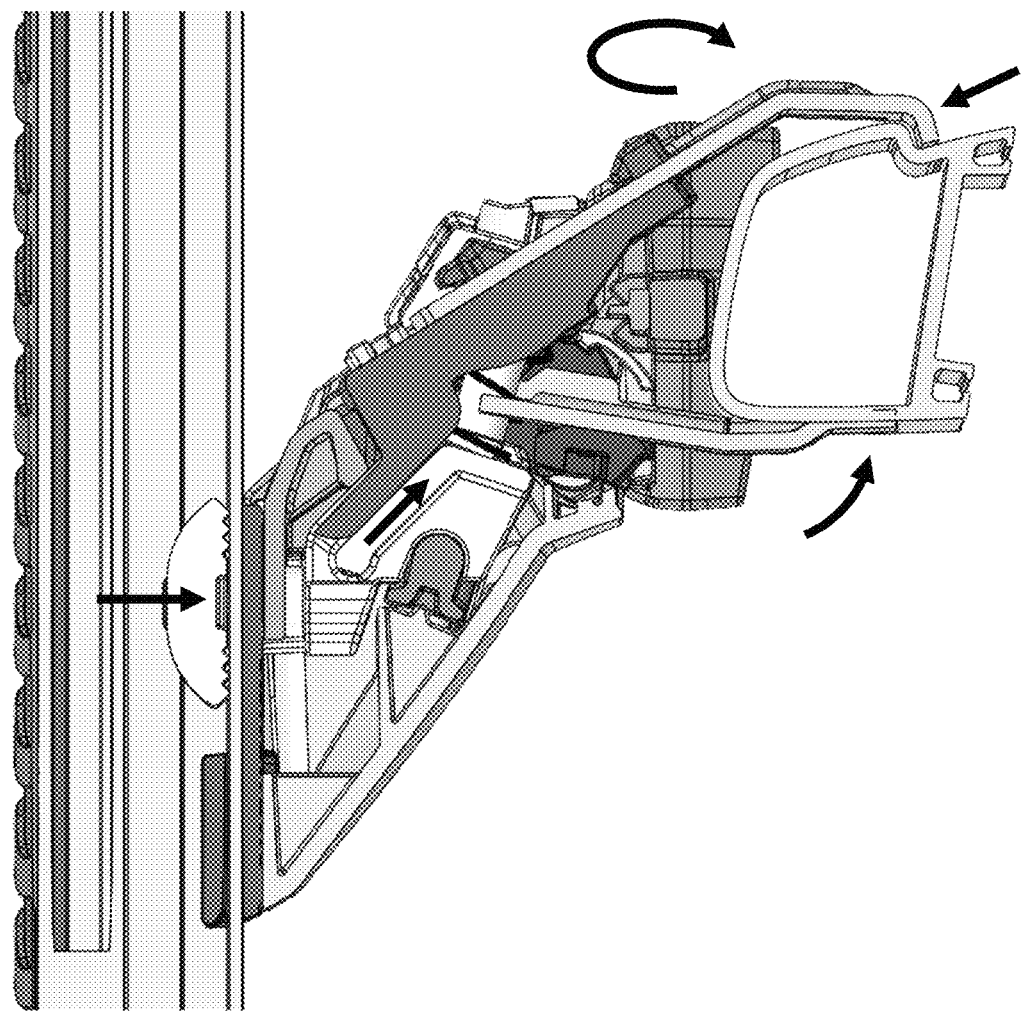
Figure 24J:
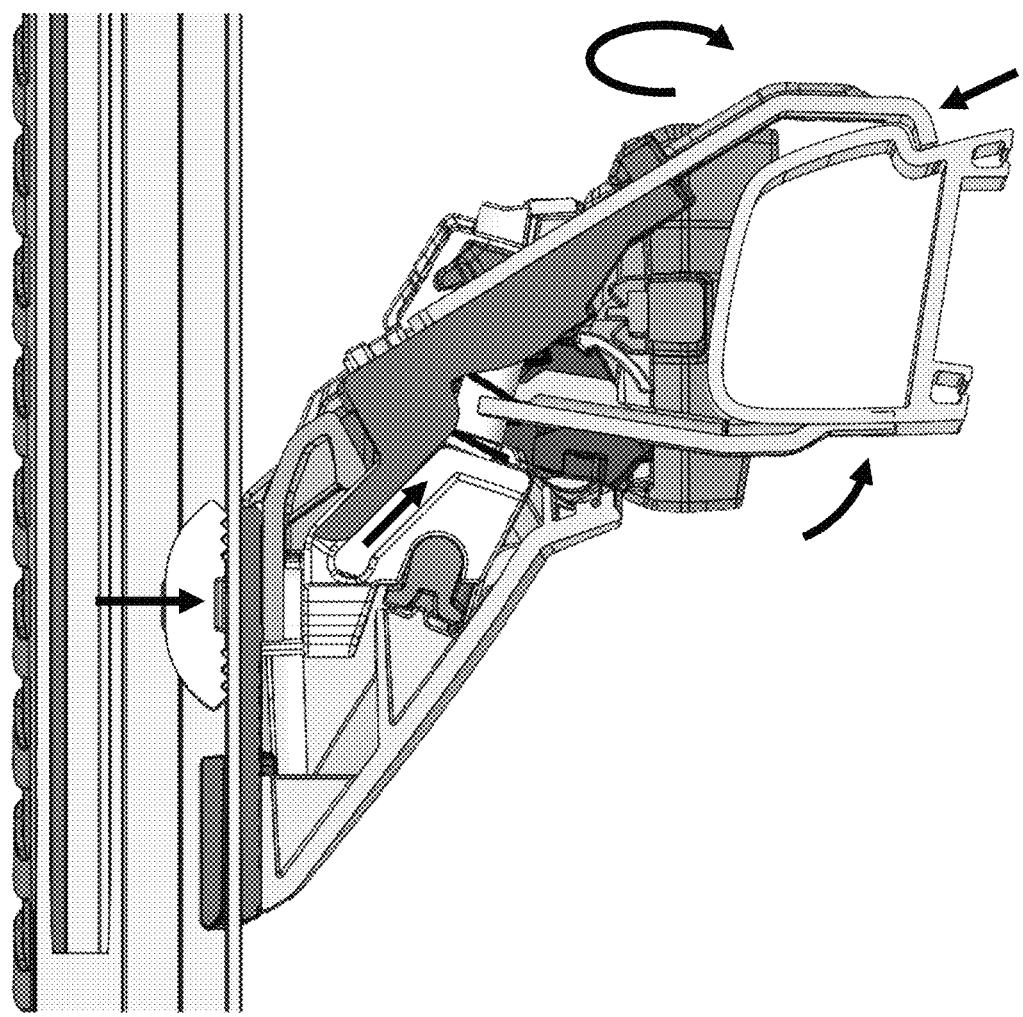

FIG. 24h illustrates continued tightening of the tightening mechanism 128 (circular arrow) but when outer (up arrow) and inner clamp jaws contact leg mounting point (for example, roof rail), outer clamp holder stops sliding up wedge and wedge slides down (down arrow). FIG. 24i illustrates continued tightening of the tightening mechanism 128 (circular arrow) that causes the wedge to slide down outer clamp holder and the article carrier mount element 120 clamps the article carrier 114. FIG. 24i illustrates continued tightening of the tightening mechanism 128 (circular arrow) and when the outer clamp jaw (up arrow), the inner clamp jaw (down curved arrow) and the article carrier mount element 120 (down straight arrow) contact. The tightening mechanism 128 is torqued to tighten the three contacts.

Further advantages of the claimed subject matter will become apparent from the following examples describing certain embodiments of the claimed subject matter.

1. An article carrier mounting leg, comprising:
   a leg frame having an upper end configured to receive a mounting portion of an article carrier thereupon, and a lower end configured to rest against a leg mounting point;
   an article carrier mounting element configured to engage with the article carrier mounting portion;
   an outer clamp jaw movably connected to and outwardly extending from an outer clamp mounting point within the leg frame; and
   a threaded tightening mechanism;
   wherein the outer clamp jaw is able to move between a first position and a second position, the first position comprising the outer clamp jaw being distal to an outer surface of the leg mounting point, and the second position comprising the outer clamp jaw being in contact with the outer surface of the leg mounting point;
   when the outer clamp jaw is in the second position, the threaded tightening mechanism is able to be inserted to form an operable connection between the outer clamp jaw and a threaded receiver; and
   actuation of the threaded tightening mechanism in a first direction induces tightening between the outer clamp jaw and threaded receiver, thereby inducing a clamping engagement between the outer clamp jaw and the mounting point outer side.

2. The article carrier mounting leg of example 1, wherein the outer clamp jaw comprises:
   a clamp body portion that receives the threaded tightening mechanism therethrough;
   a pivoting portion at a first end of the clamp body portion and shaped to pivot about the outer clamp mounting point; and
   a bracket portion for engaging with the mounting point outer side, the bracket portion extending from a second end of the clamp body portion.

3. The article carrier mounting leg of example 2, wherein the bracket portion comprises a detachable bracket that attaches to an outer face of the clamp body portion.

4. The article carrier mounting leg of example 3, wherein the detachable bracket comprises at least one aperture; and the clamp body portion comprises at least one hook-forming protrusion that engages with the at least one aperture of the detachable bracket.

5. The article carrier mounting leg of any one of examples 2 to 4, wherein the pivoting portion is a slidable pivoting portion, such that the outer clamp jaw is able to both slide relative to, and pivot about, the outer clamp mounting point.

6. The article carrier mounting leg of any one of examples 2 to 5, wherein: the outer clamp mounting point comprises a fulcrum portion; and the pivoting portion of the outer clamp jaw comprises a curved flange having a concave surface that bears against the fulcrum portion.

7. The article carrier mounting leg of example 6, wherein a radius of curvature of the concave surface of the pivoting portion is greater or substantially greater than a radius of curvature of the fulcrum portion of the outer clamp mounting point.

8. The article carrier mounting leg of example 6 or example 7, wherein the outer clamp jaw further comprises a retaining element arranged to retain the concave surface of the curved flange against the fulcrum portion of the outer clamp mounting point.

9. The article carrier mounting leg of example 8, wherein the retaining element is attachable to, and detachable from, the clamp body portion.

10. The article carrier mounting leg of example 9, wherein the bracket portion comprises a detachable bracket having at least one aperture that engages with at least one hook-forming protrusion on the clamp body portion; and
    the retaining element is further shaped to, upon attaching to the clamp body portion, maintain the at least one aperture and at least one hook-forming protrusion in engagement with one another.

11. The article carrier mounting leg of example 9, wherein the bracket portion comprises a detachable bracket having at least one hook-forming protrusion that engages with at least one aperture on the clamp body portion; and
    the retaining element is further shaped to, upon attaching to the clamp body portion, maintain the at least one aperture and at least one hook-forming protrusion in engagement with one another.

12. The article carrier mounting leg of any one of examples 6 to 11, wherein the fulcrum portion comprises a rod, pin or otherwise cylindrical element extending substantially perpendicular or approximately perpendicular to a direction of movement of the outer clamp jaw.

13. The article carrier mounting leg of any one of examples 6 to 11, wherein the fulcrum portion comprises a protrusion extending from the leg frame to provide a curved bearing surface for the concave surface of the pivoting portion of the outer clamp jaw to bear against.

14. The article carrier mounting leg of any one of examples 1 to 13, further comprising an inner clamp jaw extending from proximal to the lower end of the leg frame on an inner side of the leg mounting point.

15. The article carrier mounting leg of example 14, wherein the inner clamp jaw is pivotably mounted to the leg frame and extending from proximal to the lower end thereof, on the inner side of the leg mounting point; and
    the inner clamp jaw is urged to pivot into clamping engagement with the inner side of the leg mounting point by the outer clamp jaw bearing against an upper end of the inner clamp jaw.

16. The article carrier mounting leg of example 15, wherein the inner clamp jaw comprises an inner clamp body that pivotably mounts to the inner frame; and
    a detachable inner clamp bracket that engages with the inner side of the leg mounting point.

17. The article carrier mounting leg of example 16, wherein the inner clamp body comprises a slot that receives the detachable inner clamp bracket, and a hook-shaped retaining structure protruding into the slot that engages with an aperture in the detachable inner clamp bracket.

18. The article carrier mounting leg of example 16, wherein the inner clamp body comprises a slot that receives the detachable inner clamp bracket, and an aperture within a wall of the slot that engages with a hook-shaped retaining structure extending from the detachable inner clamp bracket.

19. The article carrier mounting leg of any one of the above examples,
wherein: the threaded receiver comprises a sliding body and
a threaded aperture that receives the second end portion of the threaded tightening mechanism; and
actuation of the threaded tightening mechanism in the first direction urges the threaded receiver and the outer clamp jaw towards one another.

20. The article carrier mounting leg of example 19, wherein the threaded tightening mechanism is able to pivot, slide or otherwise move with respect to either or both of the outer clamp jaw and the threaded receiver so as to remain appropriately oriented relative thereto;
the pivoting, sliding or other movement being about an axis perpendicular or approximately perpendicular thereto.

21. The article carrier mounting leg of example 20, wherein the threaded aperture of the threaded receiver is provided by a pivotable threaded nut.

22. The article carrier mounting leg of example 20 or example 21, wherein the outer clamp jaw comprises an aperture that the longitudinal body of the threaded tightening mechanism extends through; and
the aperture is shaped to enable the threaded tightening mechanism to pivot, slide or otherwise move about the axis perpendicular or approximately perpendicular thereto.

23. The article carrier mounting leg of any one of examples 19 to 22, wherein the article carrier mounting element comprises an engaging portion that engages with the mounting portion of the article carrier; and
the engaging portion is mechanically connected to the sliding body of the threaded receiver, such that urging the sliding body and the outer clamp jaw towards one another pulls the article carrier mounting portion against the upper end of the leg frame.

24. The article carrier mounting leg of example 23 wherein the lower portion is a bolt, screw, pin or other form of longitudinally-extending fastener that extends through an aperture in the engaging portion.

25. The article carrier mounting leg of any one of the above examples, wherein the leg frame comprises an assembly of a plurality of leg frame portions.

26. An article carrier mounting leg, comprising:
a leg frame having an upper end configured to receive a mounting portion of an article carrier thereupon, and a lower end configured to rest against a leg mounting point;
an article carrier mounting element configured to engage with the article carrier mounting portion;
a threaded receiver comprising a sliding body and a threaded aperture; and
a threaded tightening mechanism in engagement with the threaded aperture of the threaded receiver; wherein the threaded tightening mechanism is arranged such that rotating the threaded tightening mechanism urges the threaded receiver to move therealong in a first direction, while contra-rotation urges the threaded receiver to move therealong in an opposing second direction the article carrier mounting element comprises an engaging portion that engages with the mounting portion of the article carrier; and
the engaging portion is mechanically connected to the sliding body of the threaded receiver, such that movement of the threaded receiver in the first direction pulls the article carrier mounting portion against the upper end of the leg frame.

27. A method of attaching an article carrier mounting leg to a leg mounting point, comprising the steps of:
(i) positioning the article carrier mounting leg such that a lower end of a leg frame thereof rests against the leg mounting point;
(ii) arranging a mounting portion of an article carrier to be in engagement with an article carrier mounting element of the article carrier mounting leg, proximal to an upper end of the article carrier mounting leg configured to receive the mounting portion;
(iii) pivoting an outer clamp jaw that is movably connected to an outer clamp mounting point within the leg frame from a first position to a second position; and
(iv) inserting a threaded tightening mechanism through the outer clamp jaw and into engagement with a threaded receiver;
wherein the first position comprises the outer clamp jaw being distal to an outer surface of the leg mounting point; and
the second position comprises the outer clamp jaw being in contact with the outer surface of the leg mounting point.

28. A method of attaching an article carrier mounting leg to a leg mounting point, comprising the steps of:
(i) positioning the article carrier mounting leg such that a lower end of a leg frame thereof rests against the leg mounting point;
(ii) arranging a mounting portion of an article carrier to be in engagement with an article carrier mounting element of the article carrier mounting leg, proximal to an upper end of the article carrier mounting leg configured to receive the mounting portion; and
(iii) actuating a thread tightening mechanism of the article carrier mounting leg, which extends through an outer clamp jaw movably connected to an outer clamping mounting point within the leg frame and into engagement with a threaded receiver, in a first direction, such that the outer clamp jaw is urged to slide from a first position to a second position;
wherein the first position comprises the outer clamp jaw being in loose contact with an outer surface of the leg mounting point; and
the second position comprises the outer clamp jaw being in clamping contact with the outer surface of the leg mounting point.

29. The method of example 27 or example 28, wherein the article carrier mounting leg further comprises an inner clamp jaw pivotably mounted to the leg frame and extending along an inner side of the leg mounting point; and
as the outer clamp jaw moves from the first position to the second position, it contacts an upper end of the inner clamp jaw, which is thereby urged to pivot into engagement with the inner side of the leg mounting point.

30. The method of any one of examples 27 to 29, wherein the threaded receiver comprises a sliding body and a threaded aperture that receives an end portion of the threaded tightening mechanism; and actuation of the threaded tightening mechanism in the first direction urges the threaded receiver and the outer clamp jaw towards one another.

31. The method of example 30, wherein the article carrier mounting element comprises:
  a lower end portion that is mechanically connected to the sliding body of the threaded receiver; and
  an engaging portion that extends through the upper end of the leg frame and engages with the article carrier mounting portion;
  such that urging the threaded receiver and the outer clamp jaw towards one another pulls the article carrier mounting portion against the upper end of the leg frame.

32. A method of attaching an article carrier mounting leg to a leg mounting point, comprising the steps of:
  (i) positioning the article carrier mounting leg such that a lower end of a leg frame thereof rests against the leg mounting point;
  (ii) arranging a mounting portion of an article carrier to be in engagement with an article carrier mounting element of the article carrier mounting leg, proximal to an upper end of the article carrier mounting leg configured to receive the mounting portion;
  (iii) pivoting an outer clamp jaw that is movably connected to an outer clamp mounting point within the leg frame from a first position to a second position;
  (iv) inserting a threaded tightening mechanism through an aperture in the outer clamp jaw and into engagement with a threaded receiver; and
  (v) actuating the threaded tightening mechanism in a first direction, such that the outer clamp jaw is urged to slide from the second position to a third position;
  wherein the first position comprises the outer clamp jaw being distal to an outer surface of the leg mounting point;
  wherein the second position comprises the outer clamp jaw being in loose contact with an outer surface of the leg mounting point; and
  the third position comprises the outer clamp jaw being in clamping contact with the outer surface of the leg mounting point.

33. The method of example 32, wherein the article carrier mounting leg further comprises an inner clamp jaw pivotably mounted to the leg frame and extending from proximal to the lower end thereof, on an inner side of the leg mounting point;
  as the outer clamp jaw pivots from the first position to the second position, it contacts an upper end of the inner clamp jaw; and
  as the outer clamp jaw slides from the second position to the third position, the inner clamp jaw is urged to pivot into engagement with the inner side of the leg mounting point.

34. The method of either example 32 or 33, the threaded receiver comprises a sliding body and a threaded aperture that receives an end portion of the threaded tightening mechanism; and
  the actuation of the threaded tightening mechanism in the first direction urges the threaded receiver and the outer clamp jaw towards one another.

35. The method of example 34, wherein the article carrier mounting element comprises:
  a lower end portion that is mechanically connected to the sliding body of the threaded receiver; and
  an engaging portion that extends through the upper end of the leg frame and engages with the article carrier mounting portion;
  such that urging the threaded receiver and the outer clamp jaw towards one another pulls the article carrier mounting portion against the upper end of the leg frame.

36. The article carrier mounting leg of any one of the above examples, wherein in one tightening motion of the threaded tightening mechanism secures the mounting leg to the article carrier and to the leg mounting point.

37. The method of any of the above method examples, wherein in one tightening motion of the threaded tightening mechanism secures the mounting leg to the article carrier and to the leg mounting point.

While the disclosure has been described with reference to exemplary preferred embodiments above, it will be appreciated by those of ordinary skilled in the art that it is not limited to those embodiments, but may be embodied in many other forms, variations and modifications other than those specifically described. This disclosure includes all such variation and modifications. The disclosure also includes all of the steps, features, components and/or devices referred to or indicated in the specification, individually or collectively and any and all suitable combinations or any two or more of the steps or features.

In this specification, unless the context clearly indicates otherwise, the word "comprising" is not intended to have the exclusive meaning of the word such as "consisting only of", but rather has the non-exclusive meaning, in the sense of "including at least". The same applies, with corresponding grammatical changes, to other forms of the word such as "comprise", etc.

Other definitions for selected terms used herein may be found within the detailed description and apply throughout. Unless otherwise defined, all other scientific and technical terms used herein have the same meaning as commonly understood to one of ordinary skill in the art to which the disclosure belongs.

Any promises made in the present document should be understood to relate to some embodiments of the disclosure, and are not intended to be promises made about the invention in all embodiments. Where there are promises that are deemed to apply to all embodiments of the invention, the applicant/patentee reserves the right to later delete them from the description and they do not rely on these promises for the acceptance or subsequent grant of a patent in any country.

In the foregoing description of certain embodiments, specific terminology has been resorted to for the sake of clarity. However, the disclosure is not intended to be limited to the specific terms so selected, and it is to be understood that a specific term includes other technical equivalents which operate in a similar manner to accomplish a similar technical purpose.

Terms such as "left" and "right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It is to be understood that the present disclosure is not limited to the disclosed embodiments, and is intended to cover various modifications and equivalent arrangements included within the spirit and scope of the present disclosure. Also, the various embodiments described above may be implemented in conjunction with other embodiments, e.g., aspects of one embodiment may be combined with aspects of another embodiment to realize yet other embodiments. Further, independent features of a given embodiment may constitute an additional embodiment.

The invention claimed is:

1. An article carrier mounting leg, comprising:
a leg frame having an inclined surface, an upper end configured to receive a mounting portion of an article carrier thereupon, and a lower end configured to rest against a leg mounting point;
an article carrier mounting element configured to engage with the mounting portion of the article carrier;
a threaded receiver comprising a sliding body and a threaded aperture; and
a threaded tightening mechanism in engagement with the threaded aperture of the threaded receiver, wherein:
the threaded tightening mechanism is arranged such that rotating the threaded tightening mechanism urges the threaded receiver to move therealong in a first direction, while contra-rotation urges the threaded receiver to move therealong in an opposing second direction;
the article carrier mounting element comprises an engaging portion that engages with the mounting portion of the article carrier;
an outer clamp jaw comprising a pivoting portion having a curved flange, the clamp jaw being movably connected to and outwardly extending from an outer clamp mounting point within the leg frame; and
the engaging portion is mechanically connected to the sliding body of the threaded receiver, the sliding body acts as a wedge between the inclined surface and the curved flange of the outer clamp jaw such that movement of the threaded receiver in the first direction pulls the article carrier mounting portion against the upper end of the leg frame.

* * * * *